US011484736B2

(12) United States Patent
Austrheim

(10) Patent No.: US 11,484,736 B2
(45) Date of Patent: Nov. 1, 2022

(54) SERVICE VEHICLE FOR A STORAGE SYSTEM

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/059,273

(22) PCT Filed: Jan. 4, 2019

(86) PCT No.: PCT/EP2019/050179
§ 371 (c)(1),
(2) Date: Nov. 27, 2020

(87) PCT Pub. No.: WO2019/233632
PCT Pub. Date: Dec. 12, 2019

(65) Prior Publication Data
US 2021/0214199 A1 Jul. 15, 2021

(30) Foreign Application Priority Data

Jun. 6, 2018 (NO) .................................... 20180782

(51) Int. Cl.
*A62C 3/00* (2006.01)
*A62C 27/00* (2006.01)
(Continued)

(52) U.S. Cl.
CPC .............. *A62C 3/002* (2013.01); *A62C 27/00* (2013.01); *B62D 55/08* (2013.01); *B65G 1/0464* (2013.01);
(Continued)

(58) Field of Classification Search
CPC ........ A62C 3/002; A62C 27/00; B62D 55/08; B65G 1/0464; B65G 1/0492;
(Continued)

(56) References Cited

U.S. PATENT DOCUMENTS 4,470,742 A * 9/1984 Schindler ............. B65G 1/0478
104/162
2011/0163588 A1 4/2011 Burt et al.
(Continued)

FOREIGN PATENT DOCUMENTS

CN 103770634 5/2014
CN 104800990 A 7/2015
(Continued)

OTHER PUBLICATIONS

Office Action issued in the counterpart Chinese Patent Application No. 201980037266.4 dated Sep. 23, 2021 (21 pages).
(Continued)

*Primary Examiner* — Saul Rodriguez
*Assistant Examiner* — Ashley K Romano
(74) *Attorney, Agent, or Firm* — Osha Bergman Watanabe & Burton LLP

(57) ABSTRACT

The invention concerns a service vehicle (2) for movement on a rail system (108). The service vehicle (2) comprises a container vehicle handling part (8) for mechanical interacting with a container handling vehicle (300) operating on the rail system (108), an operational part (3) for controlling operations of the service vehicle (2) and caterpillar tracks (6) for allowing movement of the service vehicle (2) on the rail system (108) during operation.

15 Claims, 20 Drawing Sheets

(51) Int. Cl.
  *B65G 1/04* (2006.01)
  *B62D 55/08* (2006.01)
  *B66F 9/06* (2006.01)
  *B66F 9/18* (2006.01)
  *G05D 1/00* (2006.01)
  *G05D 1/02* (2020.01)

(52) U.S. Cl.
  CPC .............. *B66F 9/063* (2013.01); *B66F 9/18* (2013.01); *G05D 1/0027* (2013.01); *G05D 1/0246* (2013.01); *B65G 1/0492* (2013.01); *B65G 2207/22* (2013.01)

(58) Field of Classification Search
  CPC ........ B65G 2207/22; B66F 9/063; B66F 9/18; G05D 1/0027; G05D 1/0246
  See application file for complete search history.

(56) References Cited

U.S. PATENT DOCUMENTS

| | | | |
|---|---|---|---|
| 2013/0236278 A1* | 9/2013 | Beewen | B65G 1/0492 414/277 |
| 2016/0031501 A1 | 2/2016 | Howe | |
| 2016/0250959 A1 | 9/2016 | Blanchard | |
| 2016/0325932 A1* | 11/2016 | Hognaland | B65G 1/0464 |
| 2017/0101263 A1 | 4/2017 | Schroer | |
| 2017/0240087 A1 | 8/2017 | Swenson | |
| 2018/0134206 A1 | 5/2018 | Grivetti | |
| 2019/0225436 A1* | 7/2019 | Lindbo | B65G 1/0478 |

FOREIGN PATENT DOCUMENTS

| | | |
|---|---|---|
| CN | 106540391 A | 3/2017 |
| CN | 107466203 A | 12/2017 |
| DE | 202007003447 U1 | 5/2007 |
| GB | 1410652 | 10/1975 |
| JP | H06001591 A | 1/1994 |
| JP | 3204554 | 6/2016 |
| JP | 2017-509564 A | 4/2017 |
| NO | 317366 B1 | 10/2004 |
| TW | 201006743 A | 2/2010 |
| WO | 82/04230 | 12/1982 |
| WO | 2005/097550 | 10/2005 |
| WO | 2014/090684 A1 | 6/2014 |
| WO | 2015/140216 | 9/2015 |
| WO | 2015/193278 A1 | 12/2015 |
| WO | 2017/148963 | 9/2017 |

OTHER PUBLICATIONS

Norwegian Search Report dated Dec. 19, 2018, cited inter alia as a statement of relevance for any non-English references cited or discussed therein.
International Search Report dated Apr. 9, 2019, cited inter alia as a statement of relevance for any non-English references cited or discussed therein.
IPRP dated Oct. 28, 2020, cited inter alia as a statement of relevance for any non-English references cited or discussed therein.
Notice of Reasons for Rejection issued in Japanese Application No. 2020-567135 dated Aug. 3, 2022 (3 pages).

* cited by examiner

A

B

A

B

A

B

C

D

A

B

SERVICE VEHICLE FOR A STORAGE SYSTEM

TECHNICAL FIELD

The present invention relates to an automated storage and retrieval system, a service vehicle for transporting at least one storage container vehicles and a method thereof.

BACKGROUND AND PRIOR ART

FIGS. 1A and 2A disclose a typical prior art automated storage and retrieval system 1 with a framework structure 100. FIGS. 2A and 2B disclose a prior art container handling vehicle 101 operating the system 1 disclosed in FIGS. 1A and 2A, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the containers 106 in the stacks 107, and guides vertical movement of the containers 106, but does normally not otherwise support the storage containers 106 when stacked.

The automated storage and retrieval system 1 comprises a rail system 108 arranged in a grid pattern across the top of the storage 104 along a horizontal plane P, on which rail system 108 a plurality of container handling vehicles 200, 300 (as exemplified in FIGS. 1B and 2B) are operated to raise storage containers 106 from, and lower storage containers 106 into, the storage columns 105, and also to transport the storage containers 106 above the storage columns 105. The horizontal extension of one of the grid cells 122 constituting the grid pattern is in FIGS. 1A and 2A marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body/framework and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, $Z=1$ identifies the uppermost layer of the grid 104, i.e. the layer immediately below the rail system 108, $Z=2$ the second layer below the rail system 108, $Z=3$ the third layer etc. In the exemplary prior art grid 104 disclosed in FIGS. 1A and 2A, $Z=8$ identifies the lowermost, bottom layer of the grid 104. Consequently, as an example, and using the Cartesian coordinate system X, Y, Z indicated in FIGS. 1A and 2B, the storage container identified as 106' in FIG. 1 can be said to occupy grid location or cell $X=10$, $Y=2$, $Z=3$. The container handling vehicles 101 can be said to travel in layer $Z=0$ and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 101 may have a footprint which is larger than the lateral area defined by a grid column, e.g. as is disclosed in WO2014/090684A1.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to an access station (not shown) where the storage containers 106 can be accessed from outside of the grid 104 or transferred out of or into the grid 104. Within the art, such a location is normally referred to as a "port" and the grid column in which the port is located may be referred to as a "port column" 119,120.

The storage grids 104 in FIGS. 1A and 2A comprise two port columns 119 and 120. The first port column 119 may for example be a dedicated drop-off port column where the container handling vehicles 200,300 can drop off storage containers 106 to be transported to an access or a transfer station, and the second port column 120 may be a dedicated pick-up port column where the container handling vehicles 200,300 can pick up storage containers 106 that have been transported to the storage grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the storage grid 104 once accessed. Alternative to ports as part of the storage grids 104, it may be envisaged ports that transfer storage containers out of or into the storage grid 104, e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping rail of the storage containers 106.

A problem associated with known automated storage and retrieval systems 1 is that it is challenging for personnel to access the rail system 108 for carrying out inspection, or to carry out maintenance of or to remove malfunctioning container handling vehicles 200,300.

WO2015/140216A1 discloses a service vehicle for cleaning the grid and for inspection of the grid. The service vehicle is arranged with a releasable latching mechanism for docking with a malfunctioning container handling vehicle. After connecting with the vehicle, the service vehicle brings the vehicle to a designated location on the grid for inspection and maintenance by pulling or pushing. This publication also suggests an overhead carrying arrangement for removing a malfunctioning vehicle from the grid. In this arrangement either a bridge-shaped robotic vehicle or two parallelly arranged robotic vehicles connected with a cross beam is/are arranged with a lift for elevating the load handling device from the grid. The malfunctioning vehicle is carried in this elevated position to the designated location. In addition, the publication suggests that the service vehicle may be arranged with a seat for carrying a user to inspect and carry out maintenance. This personnel carrying version of the service vehicle may be manually operated by the user, or alternatively remotely controlled by the control system.

However, the known service vehicle is restricted to follow the underlying grid system, i.e. in the X and Y directions only. The service vehicle thus moves on the grid in the same way as that of load handling device, thus occupying a large amount of space during the service procedure due to the zigzag movement pattern both ways. The particular movement pattern also increases the time spent on the grid. In the case of automated storage and retrieval systems having a high density of container handling vehicles, such use of space and time may reduce significantly the overall efficiency. Further, the push or pull method may prove cumbersome and thereby add additional operational time of the service vehicle on the rail system.

In view of the above, it is desirable to provide a service vehicle, an automated storage and retrieval system using such a service vehicle, and a method thereof, that solve or at least mitigate one or more of the aforementioned problem related to use of prior art storage and retrieval systems.

SUMMARY OF THE INVENTION

The present invention is set forth and characterized in the independent claims, while the dependent claims describe other characteristics of the invention.

In a first aspect the invention concerns a service vehicle for movement on a rail system. The rail system may comprise a first set of parallel rails arranged in a horizontal plane P and extending in a first direction X, and a second set of parallel rails arranged in the horizontal plane P and extending in a second direction Y which is orthogonal to the first direction X, which first and second sets of rails form a grid pattern in the horizontal plane P comprising a plurality of adjacent grid cells.

The service vehicle comprises a vehicle body or framework and propulsion means or propulsion mechanism, hereinafter called roller, for allowing movement of the service vehicle over the top of the rail system during operation. The vehicle body/framework contains or support vehicle handling components/a container vehicle handling part for mechanical interacting with a container handling vehicle operating on the rail system and operational components/an operational part for controlling operations of the service vehicle other than the direct handling of the at least one container handling vehicle. The container vehicle handling part and the operational part may be separated fully or partly in space.

The roller may be any propulsion means or propulsion mechanisms configured to run over the top of the rail system, for example caterpillar tracks.

Hereinafter the term 'over the top of the rail system' signifies that the propulsion means rest on the rail system, but do not engage with the rails themselves. Hence, the service vehicle is not restricted to movement only in the direction of the rails but can move in any direction over the top of the rail system.

The roller may advantageously have an overall length L exceeding the distance across two grid cells in the first direction X and/or across two grid cells in the second direction Y when the service vehicle is moving on top of the rail system. In a more preferred configuration, the roller has an overall length L exceeding the distance across three grid cells in the first and/or the second direction X, Y, for example across 3.5 grid cells. These minimum lengths of the roller ensure safe movement of the service vehicle on the rail system. In addition, the minimum lengths ensure that the roller spreads the weight of the service vehicle across the top of several rails at any one time.

The overall length L may for example be 350 cm or more.

The term "overall length L" signifies herein the length from one extremity of the roller along its longitudinal direction to the opposite extremity of the roller along its longitudinal direction.

In order to further increase overall stability during operation on the rail system, and in particular directional stability, the roller may further have an overall width W that exceeds the width of adjacent rails when the service vehicle is moving on the rail system, i.e. exceed the width of one grid cell.

The term "overall width W" signifies herein the width from one extremity of the roller perpendicular to its longitudinal direction to the opposite extremity of the roller perpendicular to its longitudinal direction, including any gap G therebetween.

The roller may comprise a longitudinal extending endless belt of the length L and a belt motor driving the endless belt. The belt may be made of a flexible or resilient material such a material comprising rubber. Alternatively, or in addition, the coupling of the roller to the vehicle body may comprise a spring arrangement. The flexibility of the roller ensures a stable operation with low risk of damaging the underlying rails.

The roller may comprise at least one roller wheel, preferably at least two roller wheels, contacting the first endless belt. Further, the belt motor may drive the endless belt via the at least one wheel or a separate wheel or a combination of both.

The at least one roller wheel may contact an inner surface of the endless belt, for example by a configuration where the endless belt is surrounding the at least one roller wheel. The rotational axis of the at least one roller wheels may be parallel to a rotational axis of the endless belt. The term 'inner surface of the endless belt' signifies herein the surface of the belt facing towards the volume of the belt confined by the belt's width W and length L.

The at least one roller wheel may act as a propulsion unit for the belts or as a tightening means for the belt or a combination thereof.

In case of at least two roller wheels it is advantageous to arrange roller wheels at each longitudinal ends of the roller.

The roller may further comprise a first caterpillar track comprising a longitudinal extending endless belt and a second caterpillar track comprising a longitudinally extending endless belt directed parallel to the first caterpillar track, for example attached to opposite side walls of a vehicle body of the service vehicle. The first caterpillar track and the second caterpillar track may be spaced apart by a gap G measured along the direction of the rotational axis of the endless belts. The width of gap G is in this embodiment preferably at least the width of a grid cell of the rail system in either the first direction X or the second direction Y.

The first and/or second caterpillar tracks is/are preferably arranged such that endless belt(s) is/are at least partly extending beyond a vehicle body containing and/or supporting the container vehicle handling part and the operational part in the direction of the rotational axis to i.a. create physical barriers protecting the operator against collisions with objects located on the rail system.

In order to ensure sufficient stiffness of the belts, and thereby ensure that the service vehicle is moving satisfactory over the top of the rail system, each belt preferably comprise one or more struttings. A further desirable increase in overall stiffness of the roller may be achieved by adding stabilization wheels contacting the belt or belts, for example on top of the belt(s) relative to the rail system.

Further, the roller may advantageously be connected symmetrically in the horizontal plane (P) to the vehicle body. For example, the first and second caterpillar tracks may be arranged at the exterior side walls of the service vehicle's vehicle body symmetrically around a center axis of the vehicle body running perpendicular to the rollers' rotational axis.

The container vehicle handling part may include a transfer device configured to transfer at least one container handling vehicle between an operating position on the rail system, that is, a lower position where the container handling vehicle is movable on the rail system, and a transport position within the vehicle body during operation, i.e. an upper position where the container handling vehicle is lifted above the rail system. The container vehicle handling part may also include a transfer motor configured to power the transfer device, thereby allowing said transfer of the container handling vehicle.

If the roller comprises two caterpillar tracks, the transfer device may be arranged at least partly between the first and second caterpillar tracks, for example fully within the container vehicle handling part and approximately centered within the gap G relative to the belts rotational axis.

In a first exemplary configuration of the service vehicle, the transfer device is configured to support the container handling vehicle from below, for example by applying a base plate onto which the container handling vehicle may be supported.

For this first exemplary configuration the transfer device may configured move between an upper and a lower position relative to the horizontal plane P and may further be configured to allow the container handling vehicle to move from its operating position on the rail system to a transport position on the base plate when the transfer device is in its lower position.

The operational part may comprise a propulsion means motor or a roller device motor, hereinafter called a roller motor, allowing movement of the service vehicle along the horizontal plane P. The operational part may further comprise an onboard operating system allowing an onboard operator to control and regulate both the direction and the speed of the service vehicle relative to the underlying rail system. The change in direction may cover a 360° rotation of the service vehicle. Alternatively, said operating system may be remotely located, hence regulating the direction and the speed of the service vehicle by remote control.

A configuration of the service vehicle allowing vertical displacement of the operational part or the container vehicle handling part or both may also be envisaged. The control and regulation of the speed also includes start and full halt.

The service vehicle may further comprise a registration unit such as an image capturing unit being configured to allow visual inspection of the surroundings of the service vehicle. The image capturing unit may for example comprise a forward camera and a rearward camera, either fixed or rotatable relative to the horizontal plane P.

The service vehicle is arranged for transporting at least one of the at least one container handling vehicle in the horizontal plane P and preferably also for transporting one or more people. Alternatively, the service vehicle may be remotely controlled.

The service vehicle may further comprise a transmitter and/or receiver for establishing signal communication with a remote control system.

The transfer device may comprise an attachment device for releasable attachment to the at least one container handling vehicle, a vertical linear actuator attached at one end at least indirectly to the vehicle body, for example via a pivot support, and the other end at least indirectly to the attachment device, wherein the vertical linear actuator is configured to displace the attachment device relative to the vehicle body in a vertical direction.

The transfer device may further comprise a horizontal linear actuator fixed to the vehicle body and which is configured to displace the attachment device relative to the vehicle body in a horizontal direction.

In a second aspect, the invention concerns an automated storage and retrieval system.

The system includes a rail system comprising a first set of parallel rails arranged in a horizontal plane P and extending in a first direction X, and a second set of parallel rails arranged in the horizontal plane P and extending in a second direction Y which is orthogonal to the first direction X, which first and second sets of rails form a grid pattern in the horizontal plane P comprising a plurality of adjacent grid cells and a service vehicle as described above.

The system may further comprise at least one container handling vehicle being configured to move on the rail system, wherein the at least one container handling vehicle comprises a wheel arrangement being configured to guide the at least one storage container vehicle along the rail system in at least one of the first direction X and the second direction Y.

The service vehicle may comprise a vehicle body/framework containing or supporting a container vehicle handling part for mechanical interaction with at least one of the at least one container handling vehicle operating on the rail system and an operational part for controlling operations of the service vehicle and a roller connected to the vehicle body allowing movement of the service vehicle on the rail system during operation. The roller has preferably a length L which exceeds the distance across two grid cells in the first direction X or the second direction Y when the service vehicle is moving on the rail system, more preferably a length L which exceeds the distance across three grid cells, for example between three and four grid cells.

The service vehicle may be in accordance with any features described above.

In a third aspect, the invention concerns a method for operating a service vehicle comprising a vehicle body. The vehicle body contains/supports a container vehicle handling part and an operational part. The service vehicle is configured to move over the top of a rail system comprising a first set of parallel rails arranged in the horizontal plane P and extending in a first direction X, and a second set of parallel rails arranged in the horizontal plane P and extending in a second direction Y which is orthogonal to the first direction X, which first and second sets of rails form a grid pattern in the horizontal plane P comprising a plurality of adjacent grid cells, each grid cell comprising a grid opening defined by a pair of neighboring rails of the first set of rails and a pair of neighboring rails of the second set of rails.

The method comprises the following steps:
guiding the service vehicle to a first position on the rail system adjacent to at least one storage container vehicle by use of the operational part,
controlling a transfer device constituting part of the container vehicle handling part to transfer the at least one container handling vehicle between an operating position on the rail system and a transport position above the rail system, for example within the vehicle body, and
guiding the service vehicle to a predetermined second position on the rail system.

The service vehicle used in the method may be in accordance with the service vehicle disclosed above.

In an alternative configuration the vehicle body of the service vehicle comprises a fence. The fence defines a loading area of the service vehicle configured for containing at least one storage container vehicles. The fence may further comprise an access ramp pivotally connected to the vehicle body for pivoting the access ramp between an inclined, lower position relative to the underlying rail system allowing the one or more storage container vehicle to be transported between the rail system and the loading area via the access ramp and a closing, upper position for closing off the loading area.

The loading area of the fence may also, or alternatively, be configured to accommodate one or more operators. In this configuration fence acts as a protective chamber for the personnel.

A protective barrier such as the protective chamber or rollers connected at the outer surface of the vehicle body is a clear advantage compared with the personnel carrying service vehicle disclosed in WO2015/140216A1 where the open operational part of the service vehicle offers little or no protection for the operator, for example in case of a collision between the service vehicle and obstacles on the rail system such as the container handling vehicles.

In yet an alternative configuration the vehicle body is movably arranged relative to the first and second belted driving wheel assembly between
a transport position, wherein a transfer device is at least partly within the horizontal extent of the first and/or second endless belt(s) perpendicular to its or their rotational axis for carrying the container handling vehicle during transport and
a operational position, wherein the transfer device is positioned outside the horizontal extend of the first and/or second endless belt(s) perpendicular to its or their rotational axis, such that lifting and lowering of the container handling vehicle is possible.

BRIEF DESCRIPTION OF THE DRAWINGS

Following drawings are appended to facilitate the understanding of the invention.

FIG. 2A shows the complete system and FIG. 1B and FIG. 2B shows examples of system operable prior art container handling vehicles.

FIG. 4A shows a front part of the service vehicle, FIG. 4B shows a rear part of the service vehicle and FIG. 4C shows the service vehicle from the side.

FIGS. 5A and B are perspective side views of the service vehicle according to FIGS. 3 and 4, where FIG. 5A and FIG. 5B show a handling device of the service vehicle in an interacting position and a transport position, respectively.

FIG. 7A shows a handling mechanism of the service vehicle in a transport position on the rail system, located adjacent to a container handling vehicle to be serviced, FIGS. 7B and C show the handling mechanism of the service vehicle in an interacting position, before and after successful interaction with the container handling vehicle, respectively, and FIG. 7D shows the service vehicle supporting the container handling vehicle by use of the handling mechanism.

FIG. 11A shows the service vehicle approaching a container handling vehicle to be serviced and with a handling mechanism of the service vehicle set in a transport position, FIG. 11B shows the service vehicle adjacent to the container handling vehicle in a position within reach of the handling mechanism and FIG. 11C shows the service vehicle supporting the container handling vehicle by use of the handling mechanism.

FIG. 13A shows the service vehicle in a transport position near the location on the rail system where the container handling vehicle is to be placed, FIG. 13B shows the service vehicle in an interacting position enabling the container handling vehicle to be moved from the service vehicle to the rail system and FIGS. 13C and D show the service vehicle in the interacting position with the container handling vehicle in an intermediate position on the service vehicle and in an operational position on the rail system, respectively.

FIGS. 15A and B are perspective side views of a service vehicle according to a fifth embodiment of the invention with a handling mechanism in a transport position, where FIG. 15A shows the service vehicle without a container handling vehicle and FIG. 15B shows the service vehicle on a rail system of an automated storage and retrieval system supporting a container handling vehicle by use of the handling mechanism.

FIG. 17A shows the service vehicle approaching a container handling vehicle to be serviced, FIG. 17B shows the service vehicle partly surrounding the container handling vehicle and FIG. 17C shows the service vehicle gripping the container handling vehicle by use of its handling mechanism.

FIGS. 18A and B are perspective side views of the service vehicle of FIGS. 16 and 17, where FIG. 18A and FIG. 18B show the service vehicle in an operating position where the container handling vehicle is contacting the rail system and a transport position where the container handling vehicle is raised above the rail system, respectively.

In the drawings, the same reference numerals have been used to indicate like parts, elements or features unless otherwise explicitly stated or implicitly understood from the context.

DETAILED DESCRIPTION OF THE INVENTION

Figure 1:
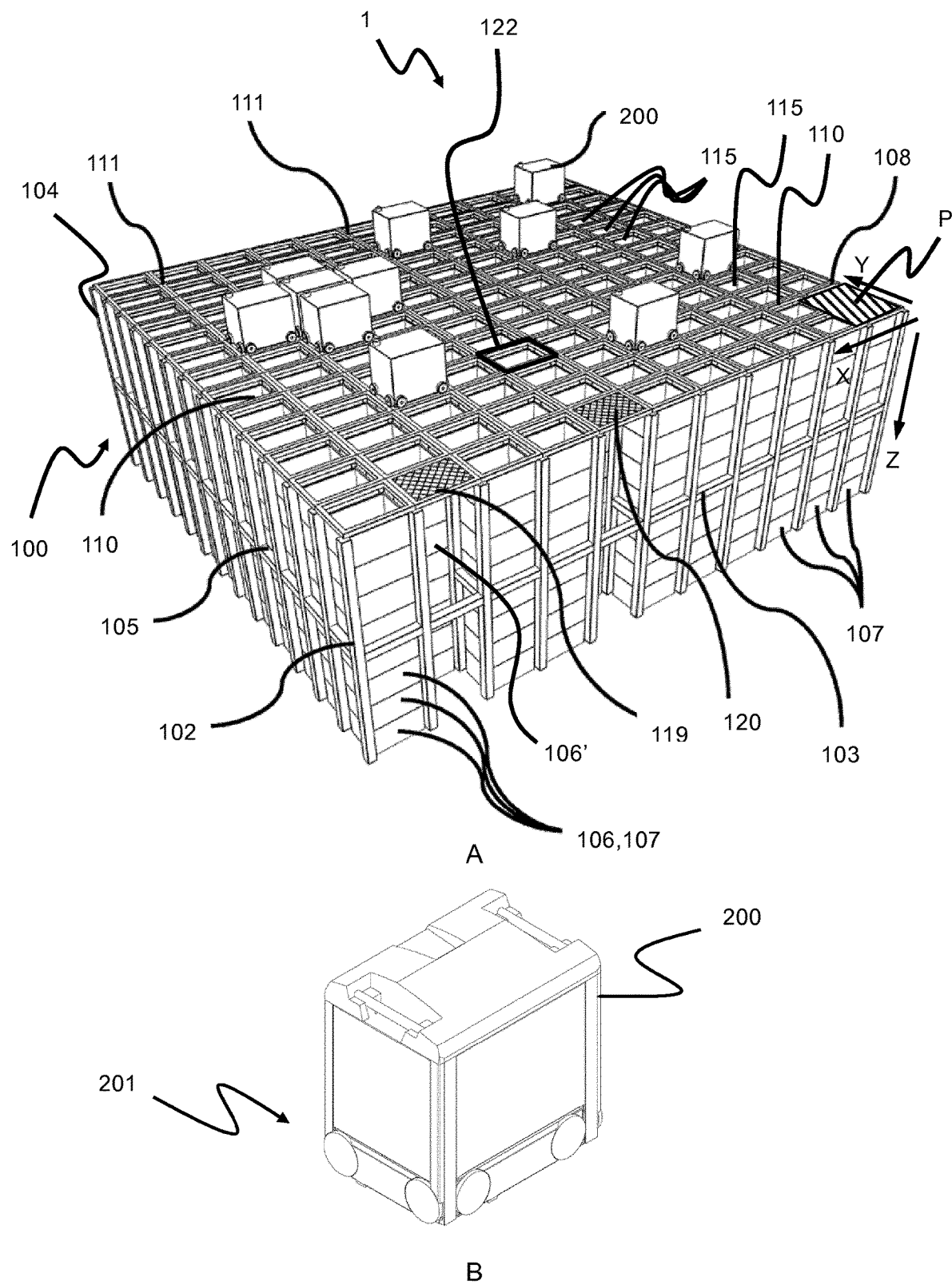
FIGS. 1 and 2 are perspectives view of a prior art automated storage and retrieval system, where FIG. 1A

In the following, embodiments of the invention will be discussed in more detail with reference to the appended drawings. It should be understood, however, that the drawings are not intended to limit the invention to the subject-matter depicted in the drawings.

Figure 2:
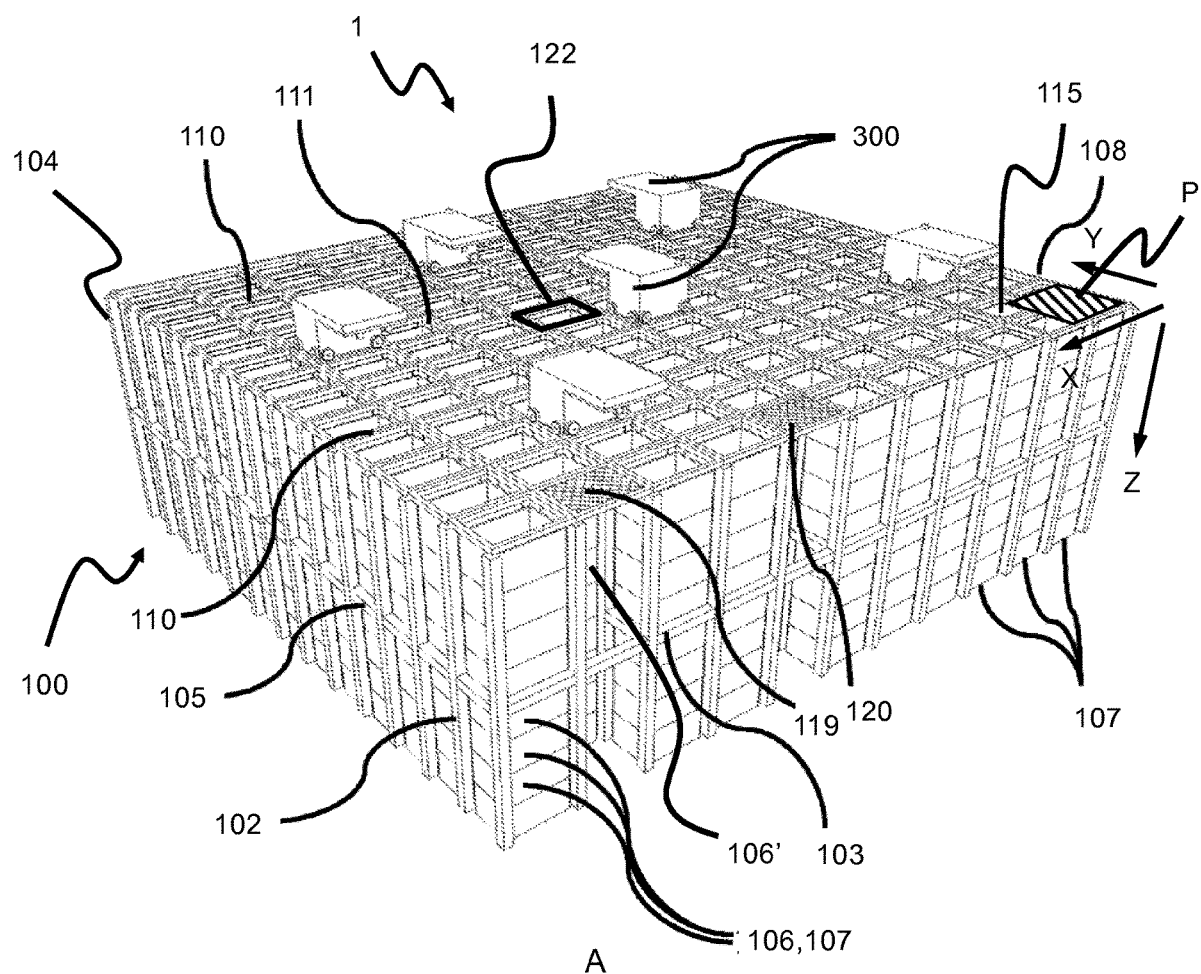
Figure 2:
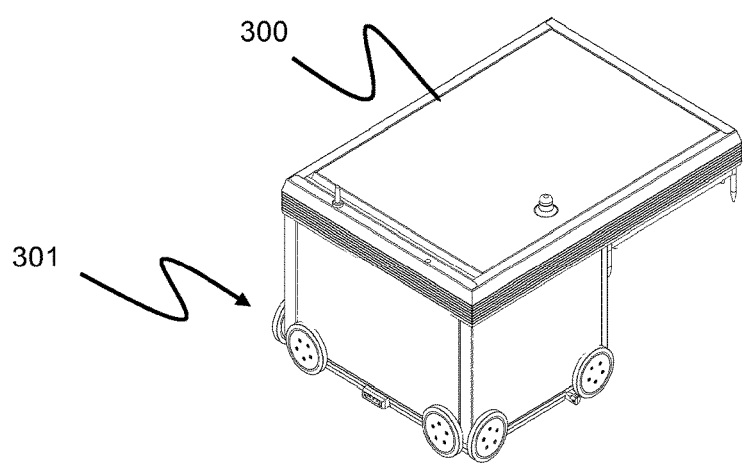

With reference to FIGS. 1 and 2 the storage grid 104 of each storage structure 1 constitutes a framework 100 of in total 1144 grid cells, where the width and length of the framework corresponds to the width and length of 143 grid columns. The top layer of the framework 100 is a rail system 108 onto which a plurality of container handling vehicles 200,300 are operated.

The framework 100 of the inventive automated storage and retrieval system 1 is constructed in accordance with the prior art framework 100 described above, i.e. a plurality of upright members 102 and a plurality of horizontal members 103 which are supported by the upright members 103, and further that the horizontal members 103 includes the rail system 108 of parallel rails 110,111 in the X direction and the Y direction, respectively, arranged across the top of storage columns 105. The horizontal area of a single grid cell, i.e. along the X and Y directions, may be defined by the distance between adjacent rails 110 and 111, respectively (see also FIGS. 3 and 4). In FIGS. 1 and 2, such a grid cell 122 is marked on the rail system 108 by thick lines.

The rail system 108 allows the container handling vehicles 200,300 to move horizontally between different grid locations, where each grid location is associated with a grid cell 122.

In FIGS. 1 and 2 the storage grid 104 is shown with a height of eight cells. It is understood, however, that the storage grid 104 can in principle be of any size. In particular it is understood that storage grid 104 can be considerably wider and/or longer than disclosed in FIGS. 1 and 2. For example, the grid 104 may have a horizontal extension of more than 700×700 grid cells 122. Also, the grid 104 can be considerably deeper than disclosed in FIGS. 1 and 2. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

Figure 3:
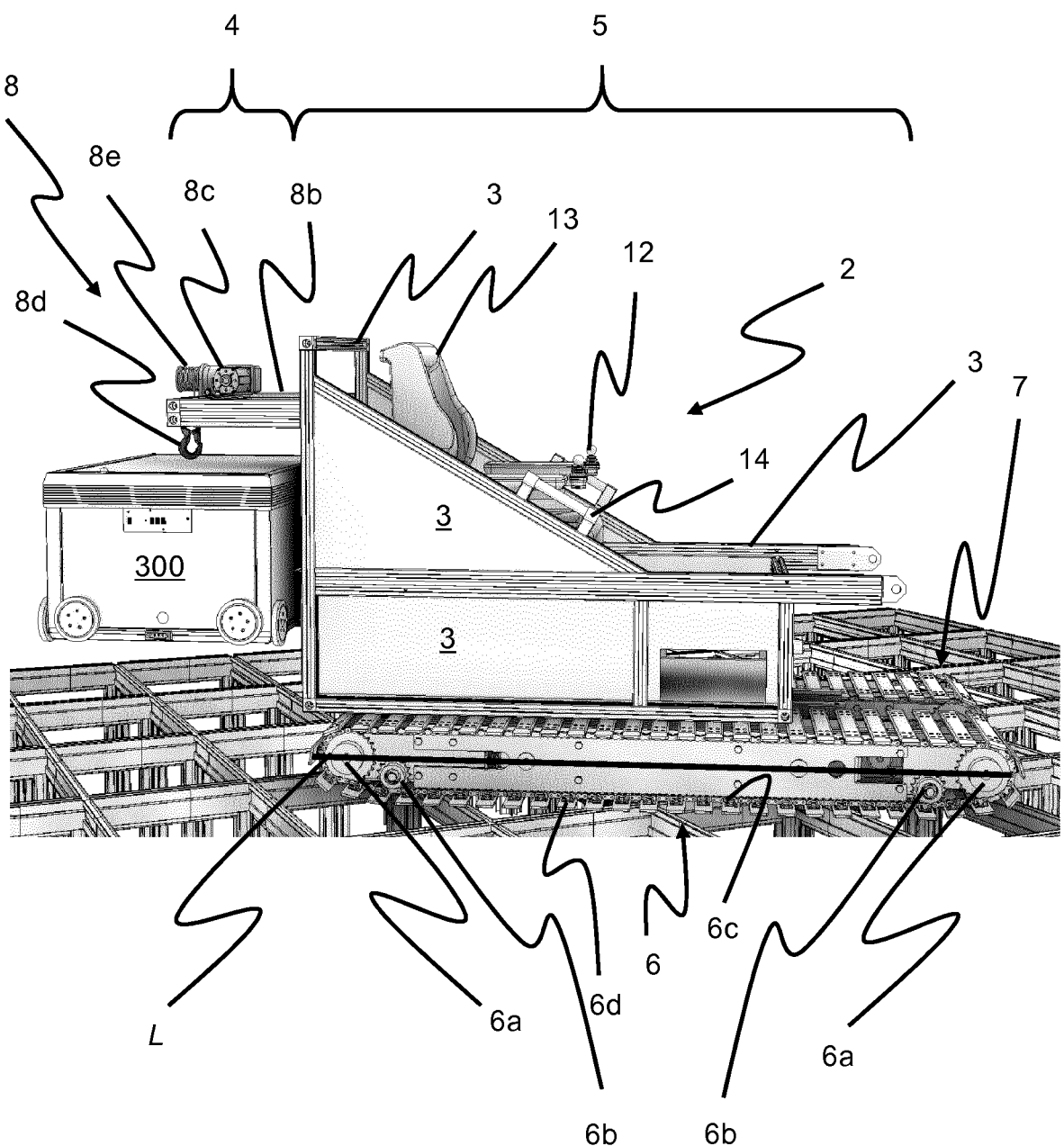
FIG. 3 is a perspective view of a service vehicle according to a first embodiment of the invention, operating on a rail system of an automated storage and retrieval system.
Figure 4:
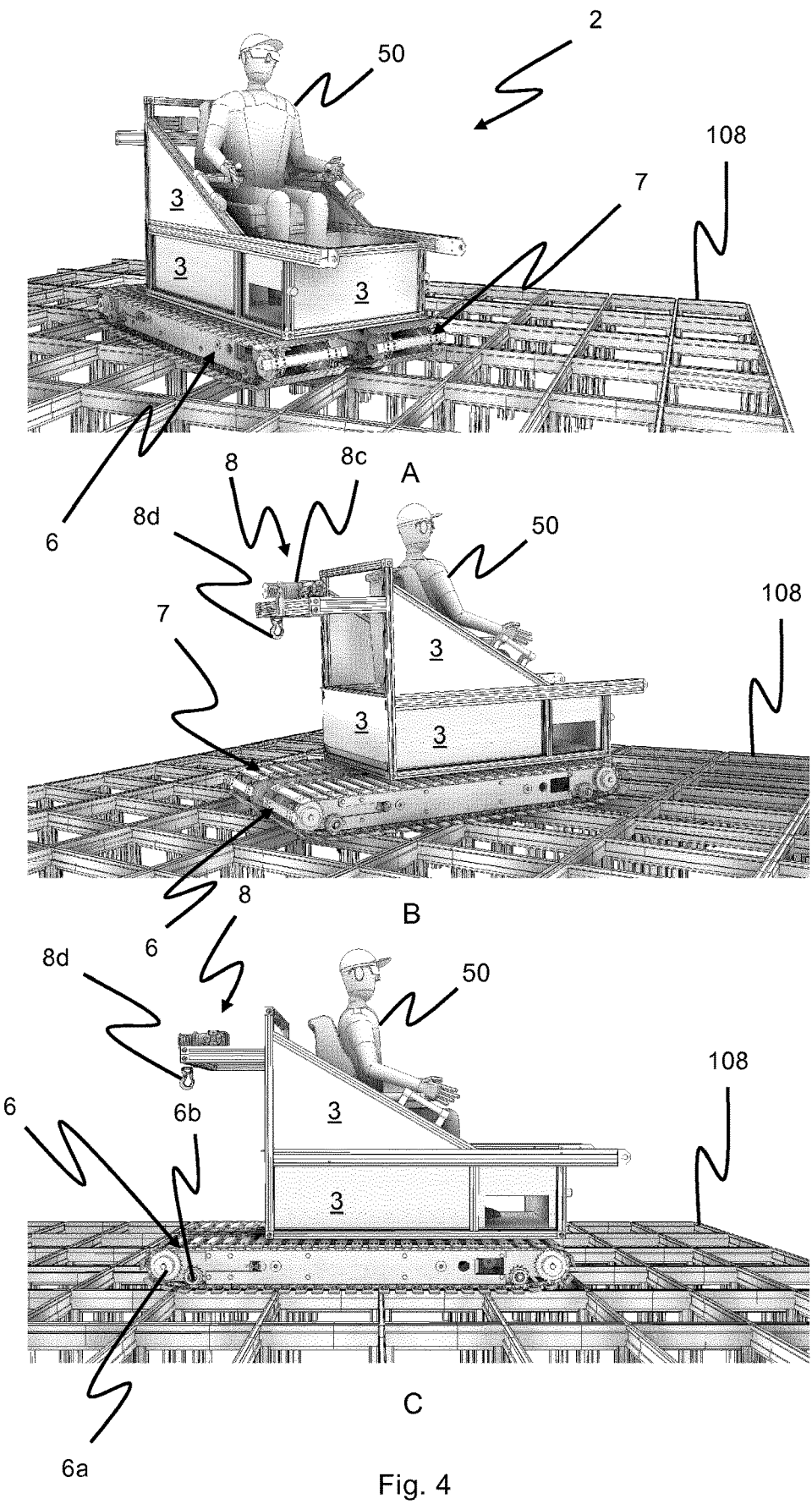
FIGS. 4A-C are perspective views of the service vehicle according to FIG. 3 without a container handling vehicle and including an operator, where
Figure 5:
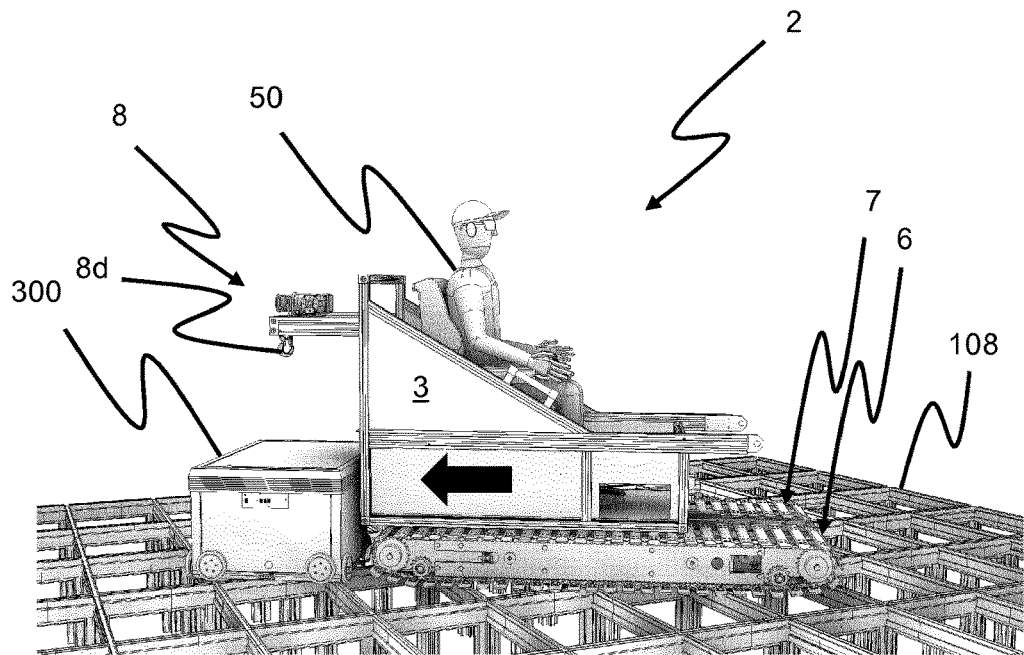
Figure 5:
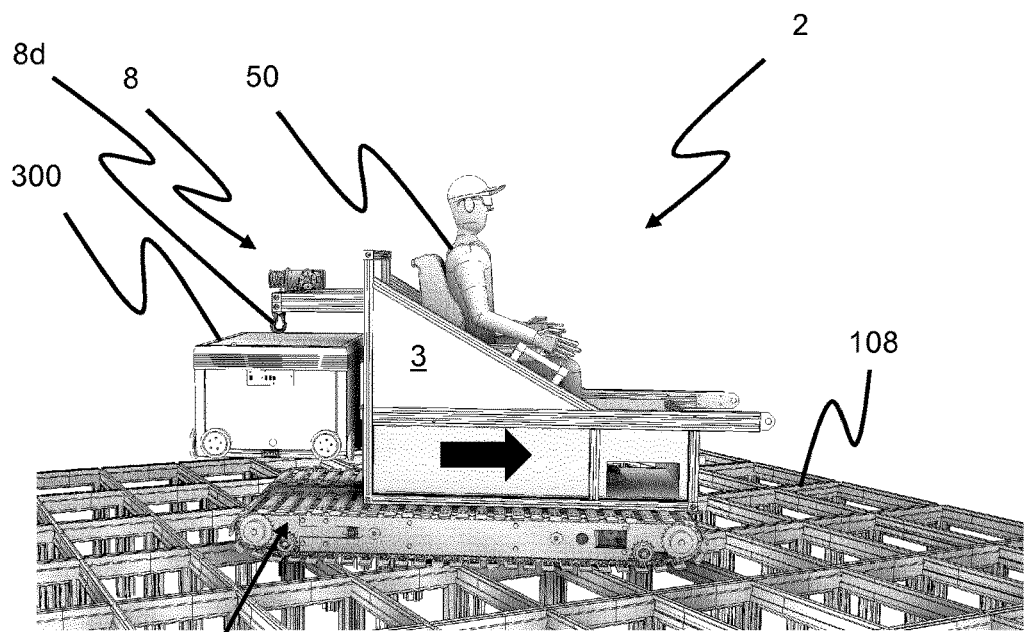
Figure 6:
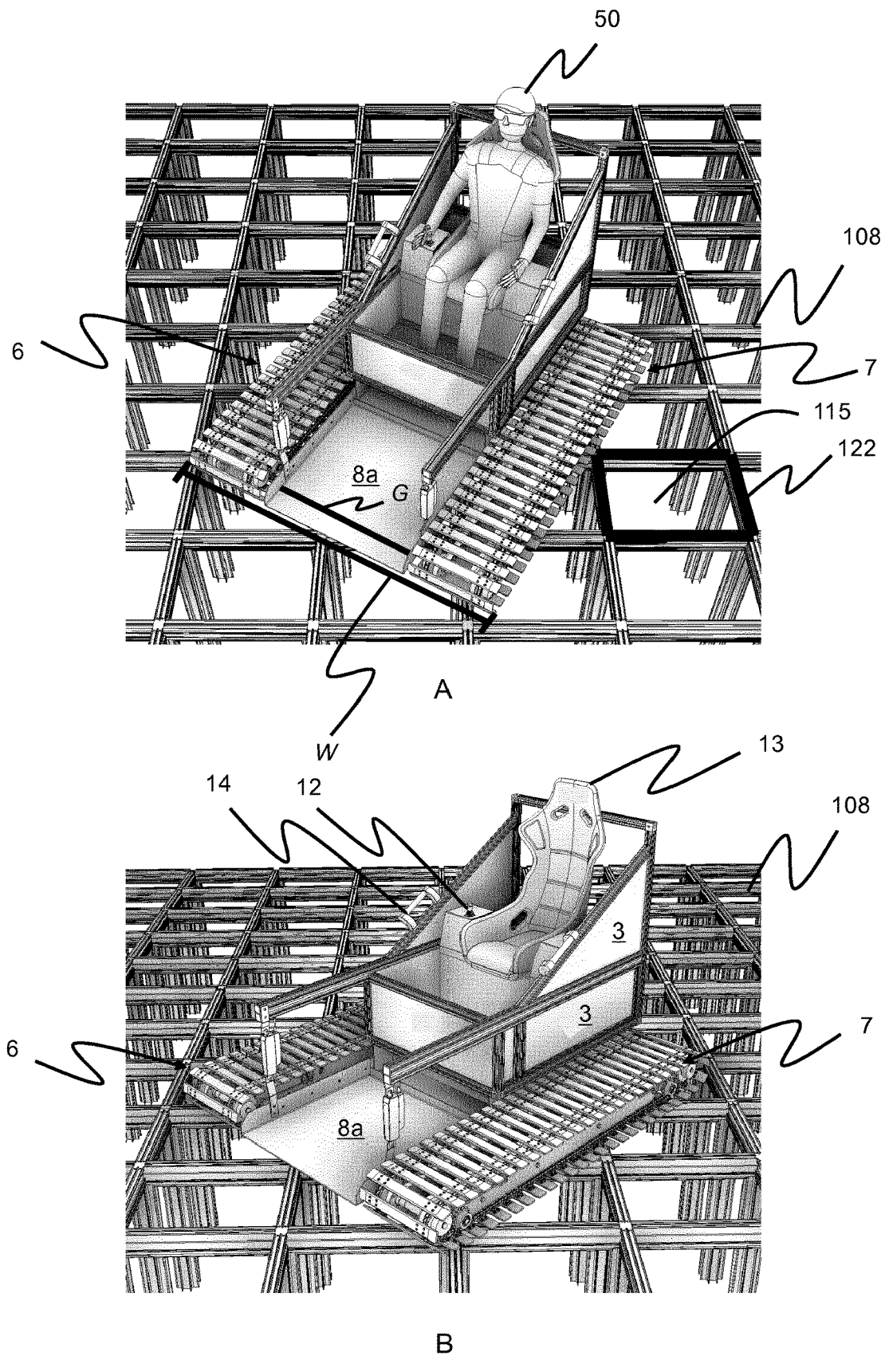
FIGS. 6A and B are perspective views of a service vehicle according to a second embodiment of the invention, operating on a rail system of an automated storage and retrieval system, where FIG. 6A
FIG. 6B shows the service vehicle with and without an operator, respectively.
Figure 7:
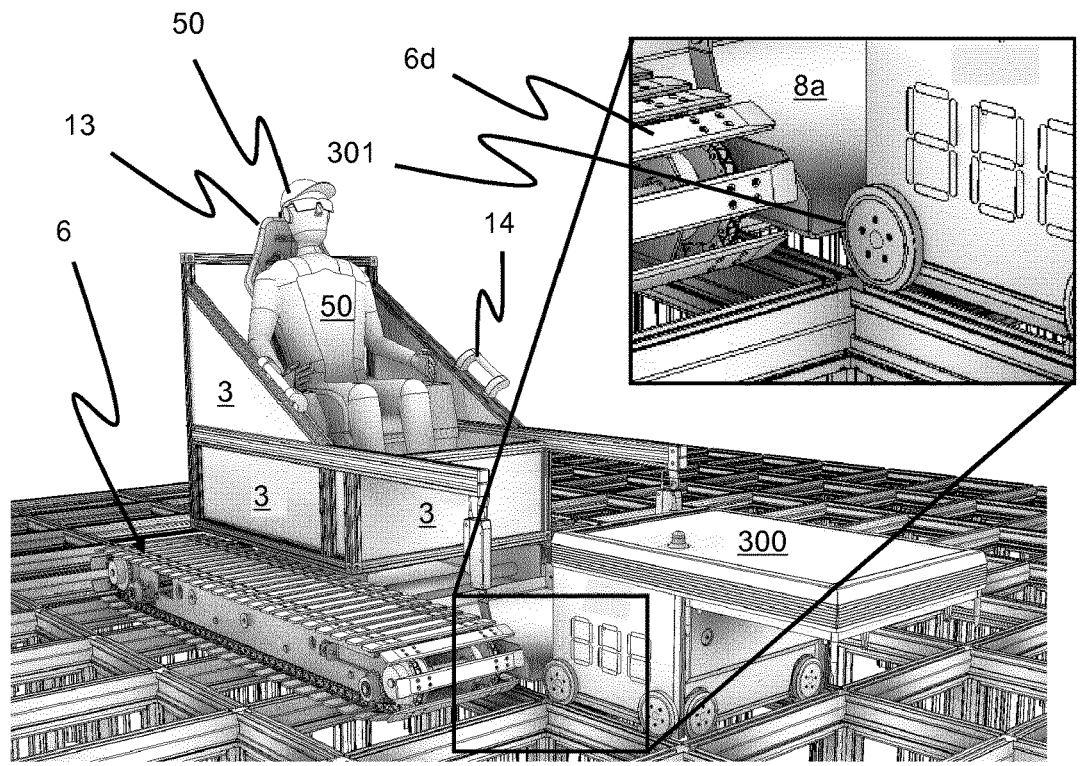
FIGS. 7A-D are perspective views of the service vehicle according to FIG. 6, where
Figure 7:
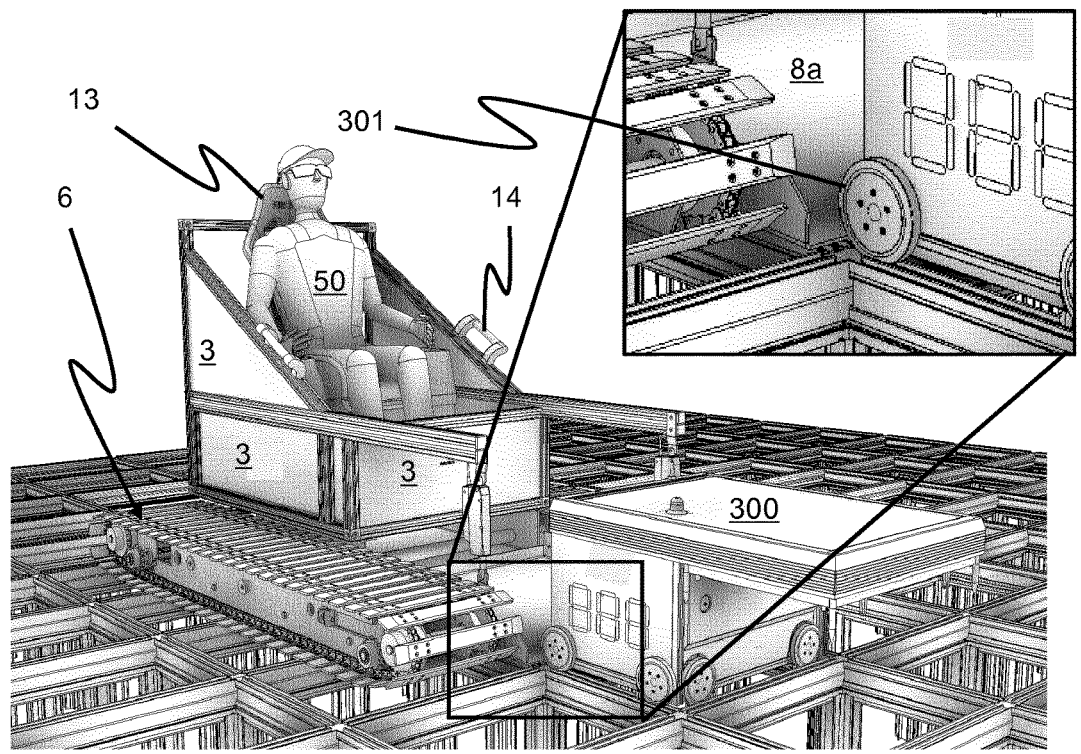
Figure 7:
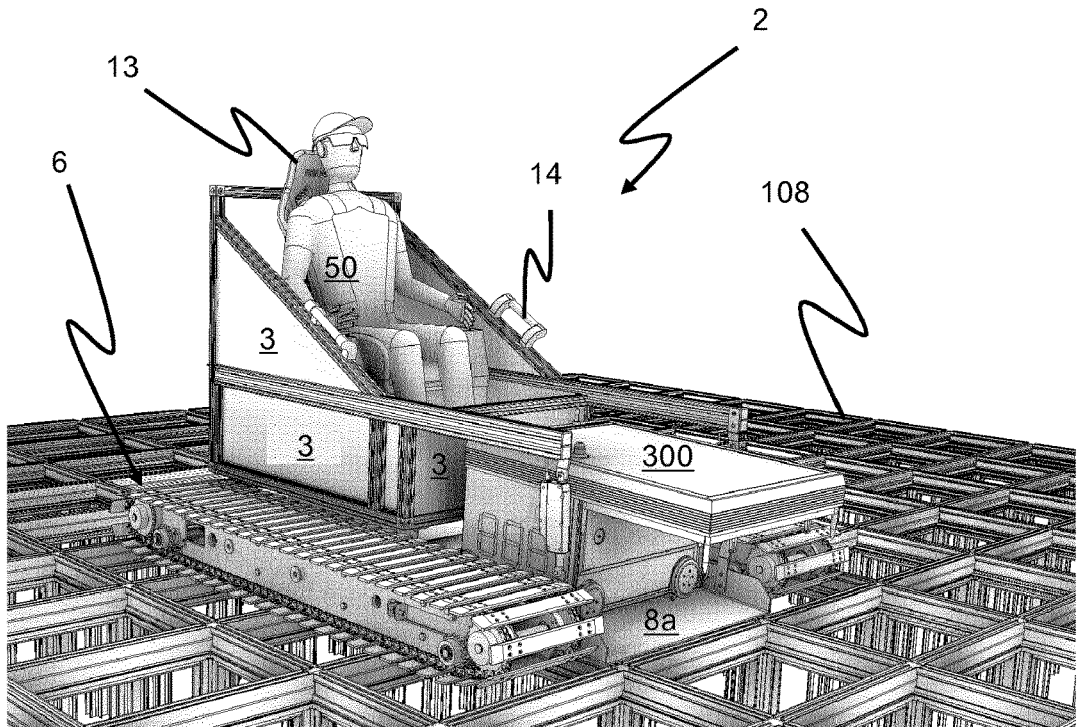
Figure 7:
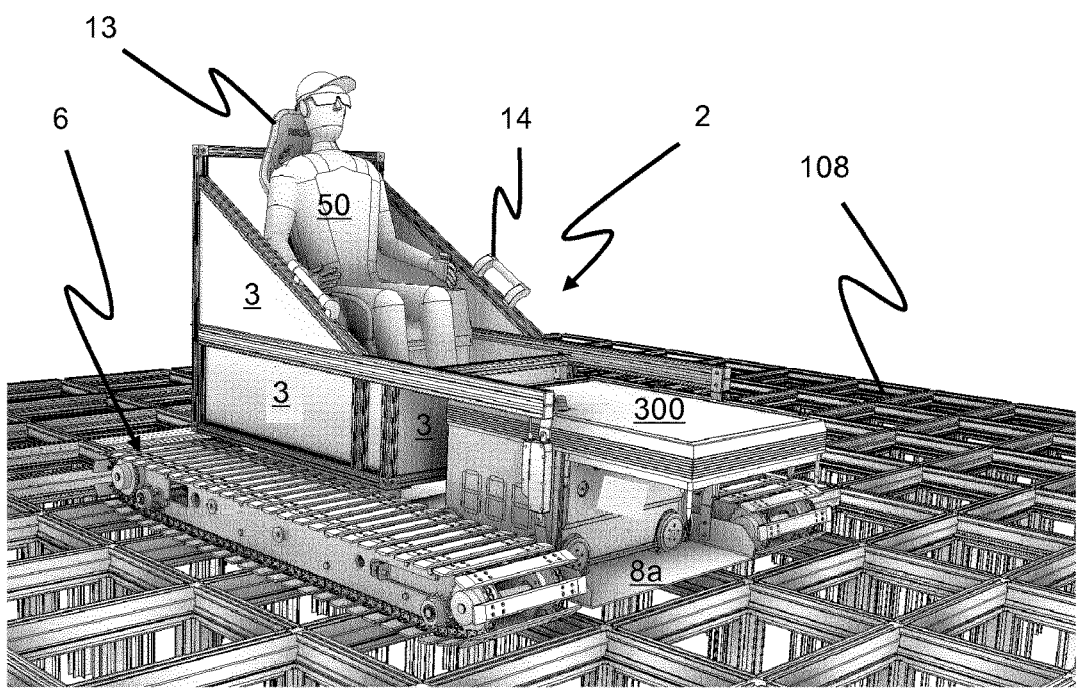
Figure 8:
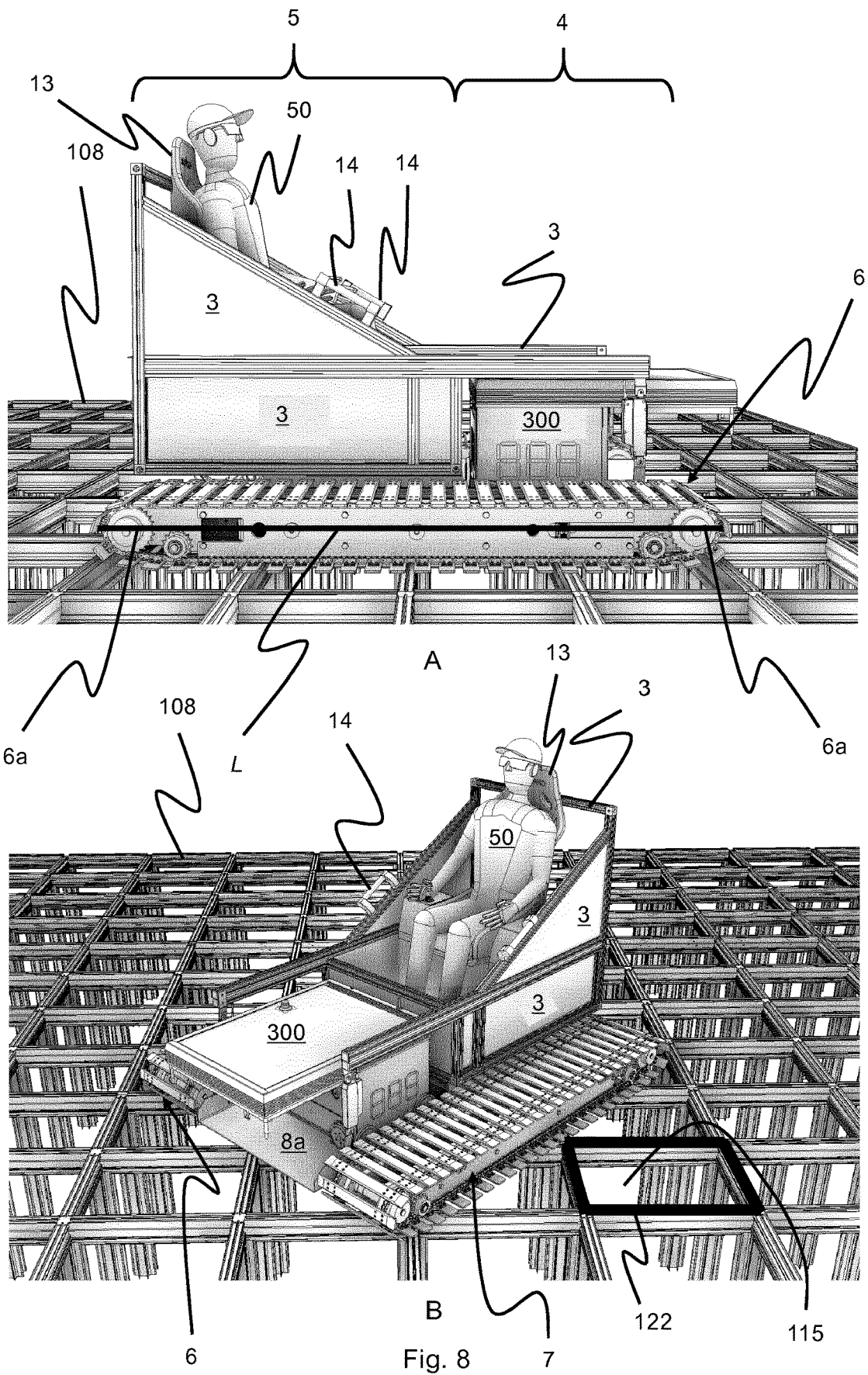
FIGS. 8A and B are perspective side views from two different directions of the service vehicle according to FIGS. 6 and 7 showing the service vehicle supporting a container handling vehicle to be serviced.

FIGS. 3-5 show a first embodiment of a service vehicle 2 arranged on the rail system 108. The service vehicle 3 comprises a vehicle body 3 and two rollers in form of caterpillar tracks 6,7, each comprising an endless belt 6d with length L and arranged at least partly below the vehicle body 3. Each of the rollers 6,7 is driven by aid of a belt motor and a belt wheel 6a,6b arranged within the belts 6d at both belt ends, i.e. at the rollers' front and rear. In one exemplary configuration a common belt motor is used for both belts 6d.

The first and second rollers 6,7 are arranged symmetrically around a vertical centerplane of the service vehicle 2 in its direction of movement and are protruding at least partly from the horizontal extremity of the vehicle body 3. The service vehicle 2 may be divided into two functional parts, a container vehicle handling part 4 including the components responsible for any mechanical interaction with the container handling vehicle 200,300 to be serviced and an operational part 5 including any components responsible for the operation of the service vehicle 2. In this particular embodiment the two parts are separated in space relative to the horizontal extent of the service vehicle 2.

Each of the first and second rollers 6,7 comprises in the example shown in FIG. 3-5 a looped chain 6d and two toothed belt wheels 6a,6b arranged inside the chain 6d at each of the rollers 6,7 longitudinal ends. The first toothed belt wheel 6*a* are arranged at the terminal end (front and rear) of the chains 6*d* and has a diameter sufficiently large to mesh with both the lower and upper parts of the chain 6*d*. The second toothed belt wheel 6*b* has in the example a smaller diameter than the first toothed belt wheel 6*a* and is arranged to mesh with the lower parts of the chains 6*d* at a location further towards the longitudinal center of the rollers 6,7.

Note that the terms "upper" and "lower" are measured relative to the underlying rail system 108.

The looped chains 6*d* constituting the two rollers 6,7, i.e. one chain 6*d* for each roller 6,7, are preferably made of a resilient material capable of not inflicting damages when moving in contact with top surfaces of the rails 110, 111. For example, each chain 6*d* may be at least partly made of, or covered by, an elastomer such as polyoxymethylene (POM). Alternatively, or in addition, the top surfaces may be covered by the same or similar materials.

One or more of the toothed wheels 6*a*,6*b* and/or one or both of the belts 6*d*, are connected to a driving mechanism comprising a driving motor (not shown). For example, one or both of the first toothed belt wheel(s) 6*a* of one or both of the belts 6*d* may function as a drive wheel which engages and drives its respective roller 6,7. Further, a second driving motor may be connected to one ore both of the second toothed belt wheels 6*b* for one or both of the rollers 6,7.

Figure 16:
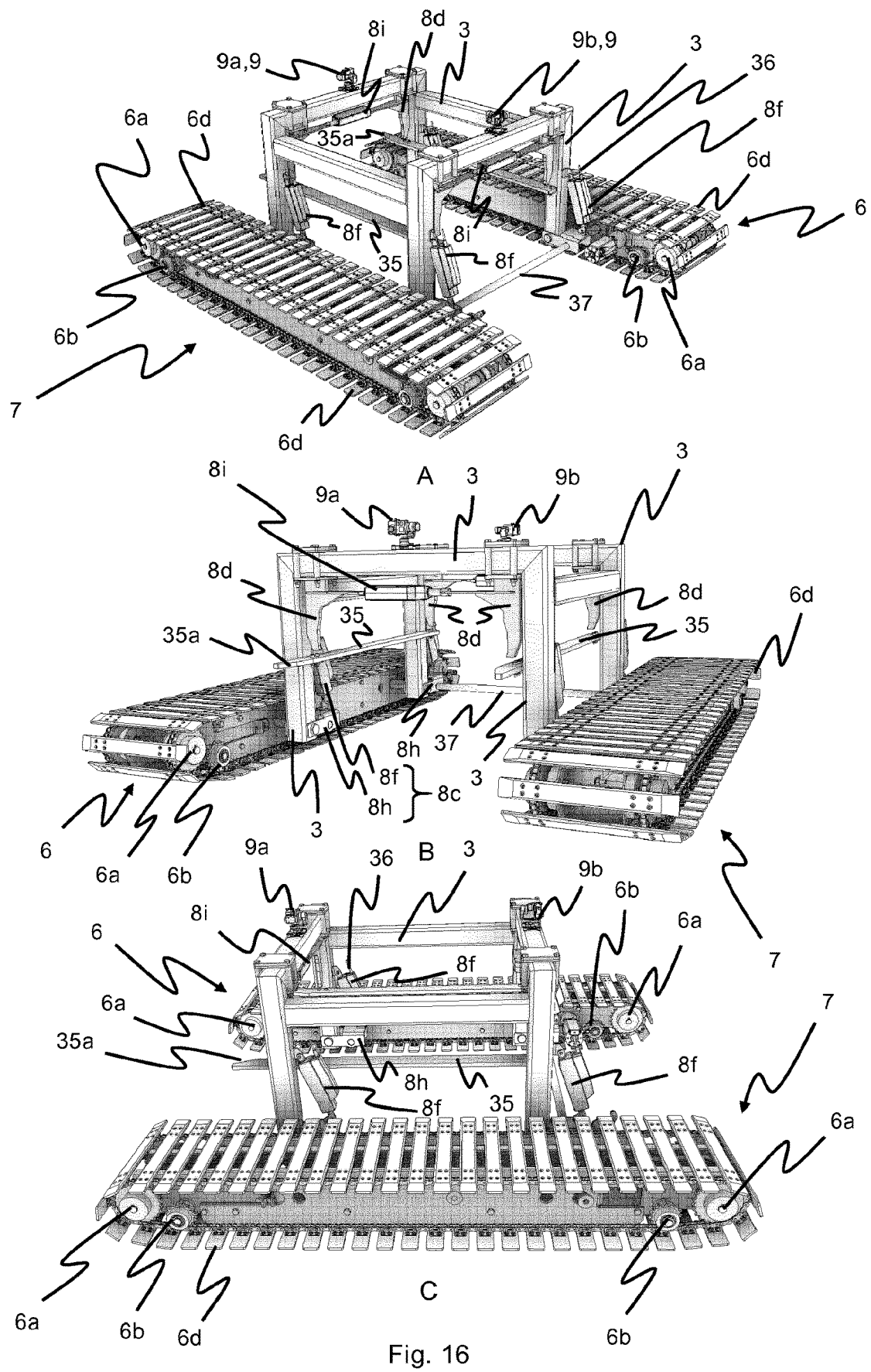
FIGS. 16A-C are perspective side views of a service vehicle according to a sixth embodiment of the invention being configured to be operated remotely.
Figure 17:
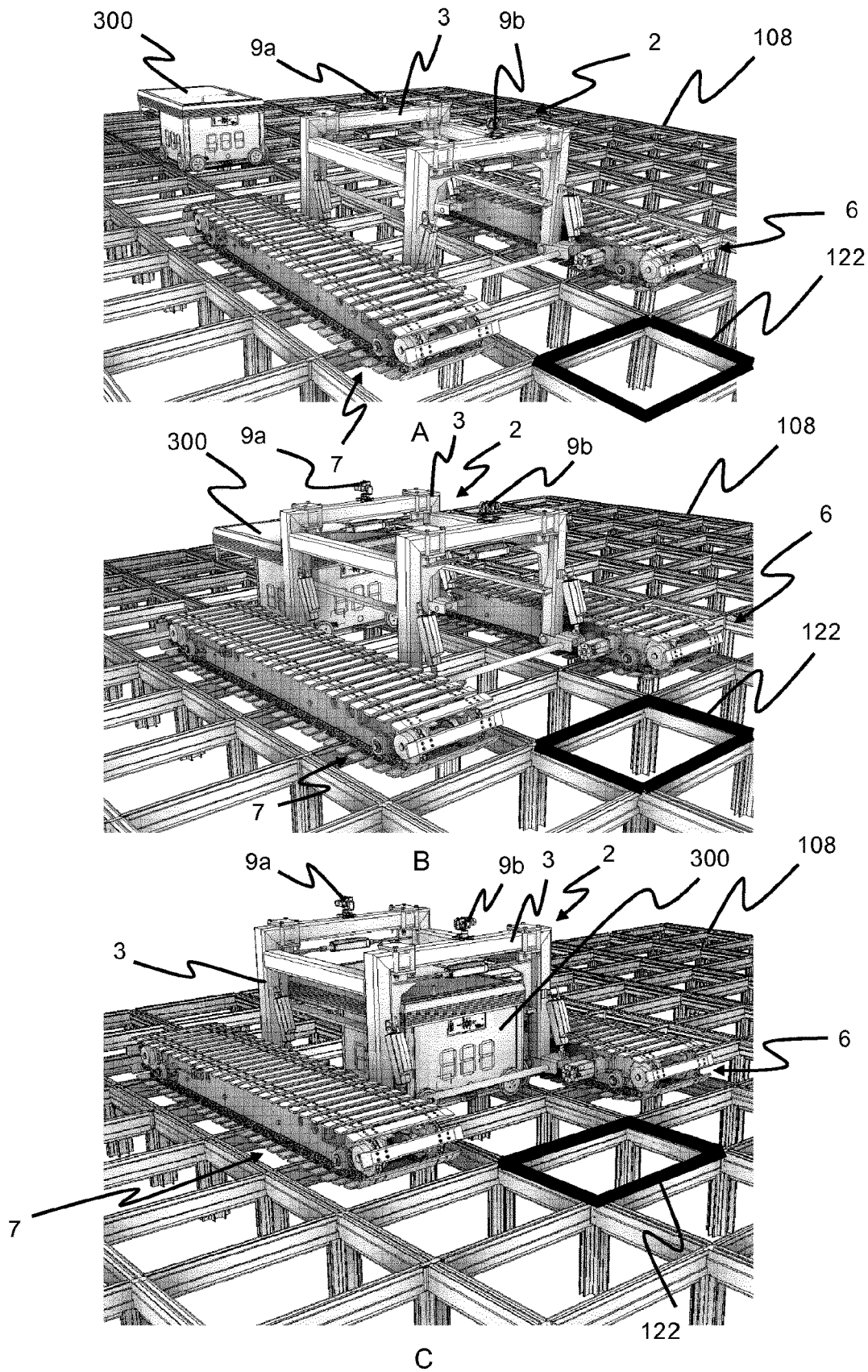
FIGS. 17A-C are perspective side views of the service vehicle of FIG. 16, where
Figure 18:
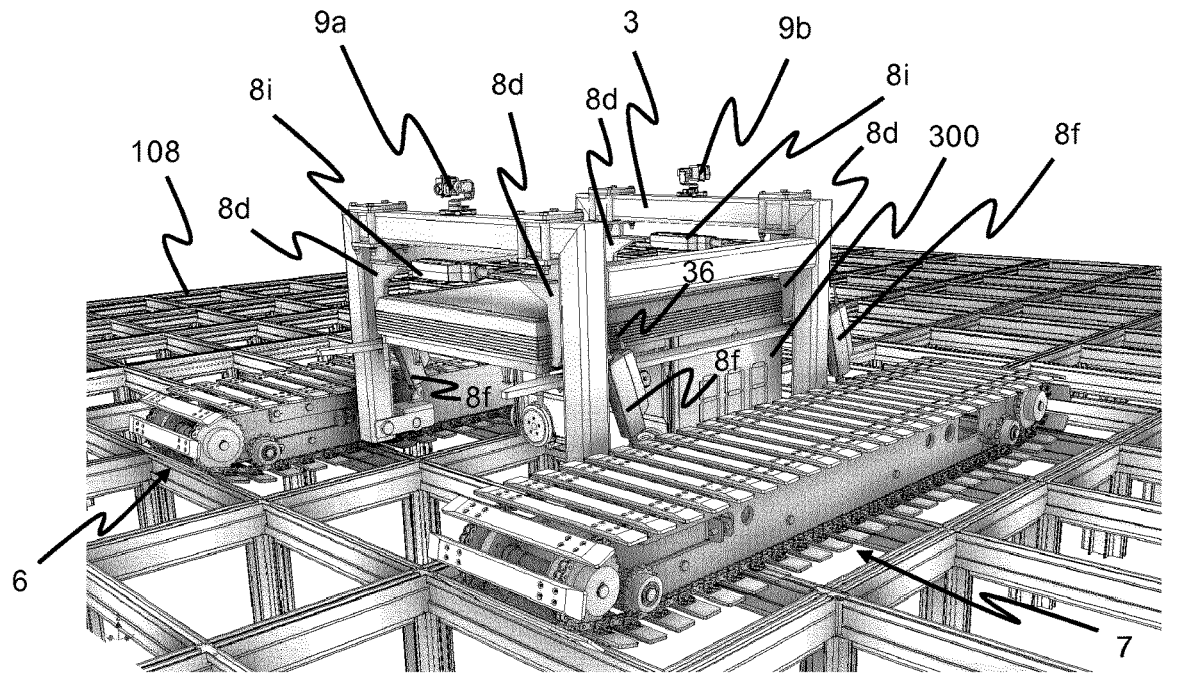
Figure 18:
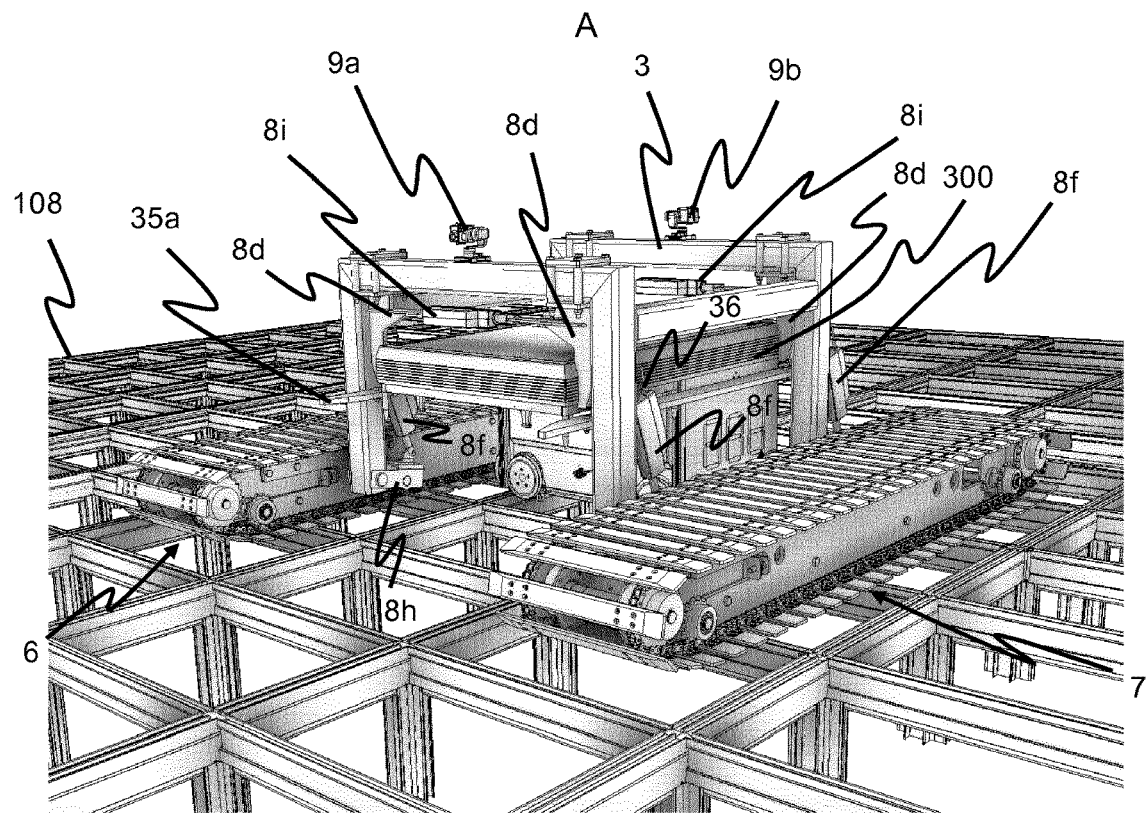

By the arrangement of the first and second rollers 6,7 the service vehicle 2 is arranged to move horizontally in any direction on the rail system 108 by a control system 12 located onboard the service vehicle 2 or remote from the service vehicle 2 (see also FIGS. 16-18). If the control system 12 is onboard the service vehicle 2, any movement pattern and speed settings may be conducted by any operator 50 located inside the service vehicle 2 by the operation of one or both of the first and second rollers 6,7 via its/their motor(s).

In the first embodiment the container vehicle handling part 4 comprises a transfer device 8 which again includes one or more transfer beams 8*b* extending from the operational part 5, a transfer motor 8*c* connected to the transfer beams 8*b* and an attachment device 8*d* operationally connected to the transfer motor 8*c*. In the particular embodiment shown in FIGS. 3-5 the attachment device 8*d* comprises a lifting hook attached to a winch line spooled onto a rotatable drum 8*e*. However, a skilled person will understand that any mechanism capable of raising and lowering a container handling vehicle 200,300 relative to the underlying rail system 108 may be applied.

Further, the operational part 5 comprises an operating system 12 with a control stick to regulate the direction of the service vehicle 2 relative to the rail system 108 and a speed regulator to regulate to the speed of the service vehicle 2 relative to the rail system 108. The operational part 5 further comprise an operator chair 13 and handles 14 on both sides of the vehicle body 3 for facilitating the exit and entrance of the operator 50 out of and into the operator chair 13, respectively. The handles 14 may also be used for other purposes such as attachment points during lifting or lowering procedures of the service vehicle 2 on to the rail system 108.

As is apparent in FIGS. 3-5, the length L of both rollers or caterpillar tracks 6,7 extends over several grid cells 122 to ensure stable operations on the rail system 108 in all horizontal directions.

The procedure for lifting up a container handling vehicle 200,300 according to the first embodiment is best seen in FIG. 5. The operator 50 maneuvers the service vehicle 2 to a position where a container handling vehicle 300 to be serviced is adjacent to the part of the service vehicle 2 closest to the transfer device 8. If needed, the operator 50 may fine adjust the horizontal position of the service vehicle 2 in order to ensure a horizontal position of the transfer device 8 ready for attachment to, and lifting of, the container handling vehicle 300. In the particular configuration shown in FIG. 5, the vehicle body 3 may be horizontally displaced relative to the rollers 6,7 as illustrated by the thick arrows, for example by use of a dedicated displacement motor and internal rail arrangement (not shown). When the container handling vehicle 300 has been raised to an elevated position above the rollers 6,7, the operator 50 may displace the vehicle body 3 relative to the rollers 6,7 to a transport position where the container handling vehicle 300 is located at least partly within the horizontal extent of the rollers 6,7, to ensure a high stability during horizontal movements of the service vehicle 2 on the rail system 108.

FIGS. 6-9 show a second embodiment of the inventive service vehicle 2. In this embodiment the transfer device 8 of the service vehicle 2 comprises a base plate 8*a* of width G being configured to support one or more container handling vehicles 200,300. The width G should thus be adapted to the overall width of the container handling vehicles 200,300 and the number of container handling vehicles 200,300 to be serviced. For example, in order for the service vehicle 2 to allow transportation of at least one container handling vehicle 200,300, the width G should be equal or larger than the corresponding width of the container handling vehicle 200,300, thereby allowing entrance onto the base plate 8*a*.

The procedure for picking up a container handling device 200,300 by the service vehicle 2 according to the second embodiment may proceed in the following way:

(FIG. 6A) An operator 50 operating the service vehicle 2 guides the service vehicle 2 to a position adjacent to the one or more container handling vehicles 200,300 to be transported.

(FIGS. 7A and B) When the service vehicle 2 is in position, the base plate 8*a* of the handling device 8 is lowered from a transport position in which the base plate 8*a* is elevated relative to the underlying rail system 108 to an interacting position in which the base plate 8*a* is contacting, or near contacting the underlying rail system 108. As is apparent from the framed detailed drawing in the upper right part of FIGS. 7A and B, one edge of the base plate 8*a* is adjacent to (FIG. 7A) or contacting (FIG. 7B) the wheel arrangement 201,301 of a container handling vehicle 200,300.

(FIG. 7C) When the base plate 8*a* is in the interacting position, the one or more container handling vehicles 200,300 are moved onto the base plate 8*a*, for example by remote operation, such that none of the wheels in the wheel arrangement are in contact with the rail system 108. Alternatively, the container handling vehicle(s) 200,300 may be kept still and the service vehicle 2 is moved so that the base plate 8*a* is forced under the container handling vehicle(s) 200,300.

(FIG. 7D) When the one or more container handling vehicles 200,300 are fully in place onto the base plate 8*a*, the operator 50 operates the transfer device 8 of the container vehicle handling part 4 such that the base plate 8*a* is lifted from the interacting position to the transport position.

(FIGS. 8A and B) The service vehicle 2 is moved to its predetermined position on the rail system 108, or out of the rail system 108, with the one or more container handling vehicles 200,300.

The unloading process, i.e. the transport of the one or more container handling vehicles 200,300 by the service vehicle 2 to a predetermined position onto the rail system 108 for regular operation, proceeds equal or similar to the above described loading process, but in reverse sequence.

With particular reference to FIG. 8A, the length of the rollers/caterpillar tracks 6,7 are in this example seen to extend across four grid cells 122.

A grid cell 122 framing a grid opening 115 is marked in FIGS. 6A and 8B with thick lines.

As for the first embodiment, the rollers 6,7 are driven by aid of a belt motor and belt wheels 6a,6b arranged within the endless belts 6d at both belt ends.

Figure 9:
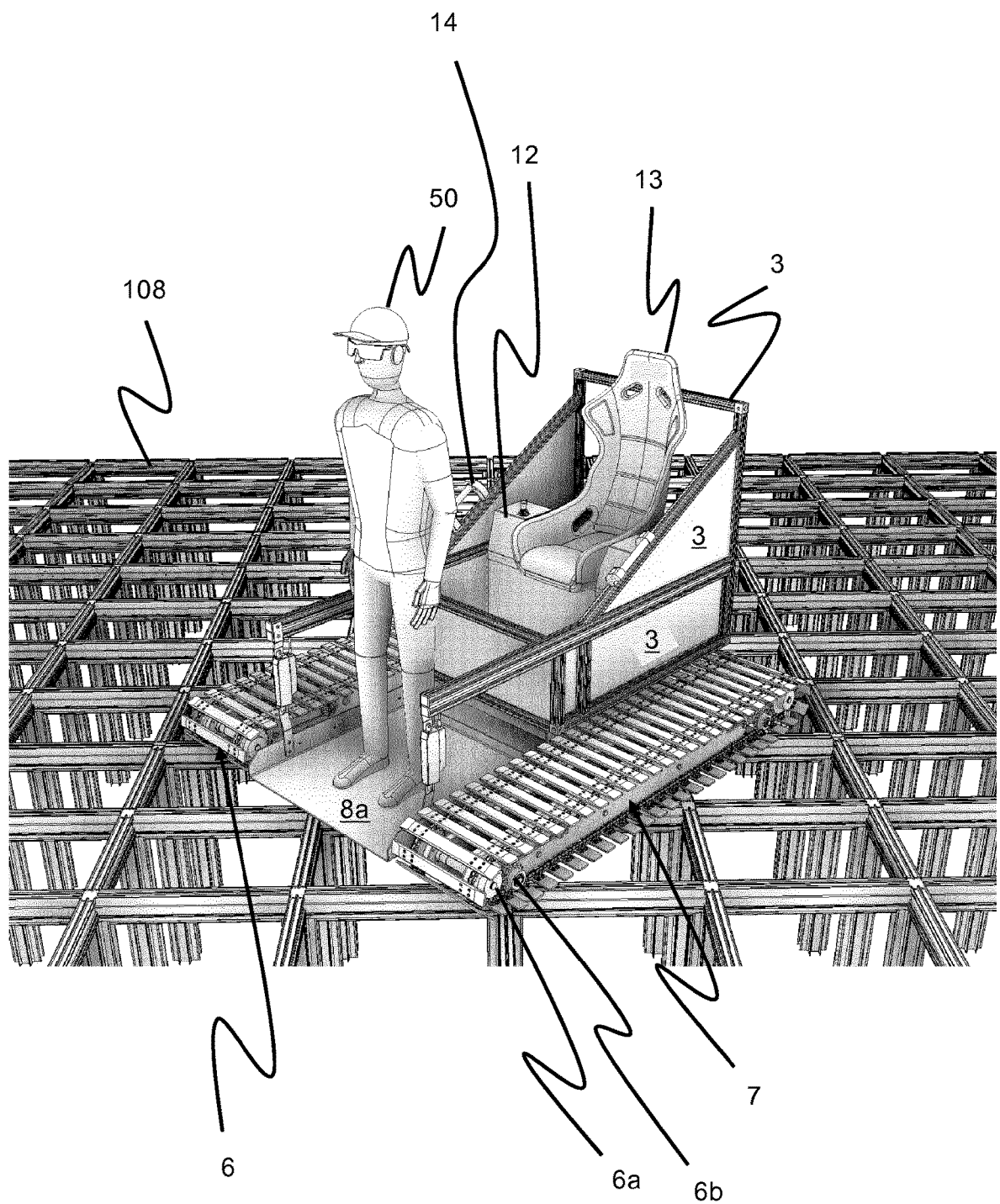
FIG. 9 is a perspective side view of the service vehicle according to FIGS. 6-8, showing the operator in a position within the surface vehicle where he can access objects situated on or below the rail system.

FIG. 9 shows that the operator 50 operating the service vehicle 2 of the second embodiment may gain access to the rail system 108, and thereby any components on the rail system 108, by using the base plate 8a as support.

Figure 10:
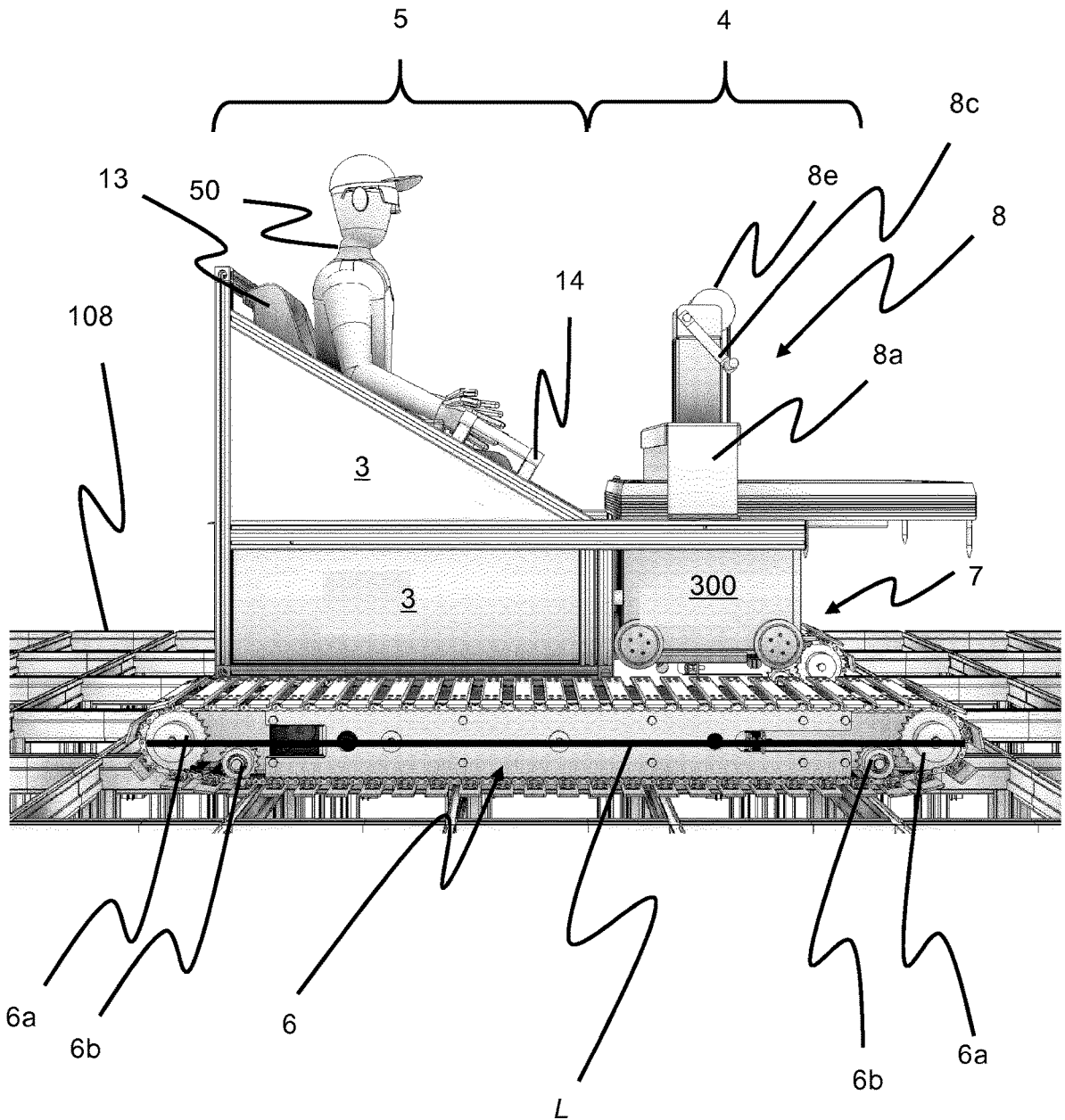
FIG. 10 is a perspective side view of a container handling vehicle supporting service vehicle according to a third embodiment of the invention, operating on a rail system of an automated storage and retrieval system.
Figure 11:
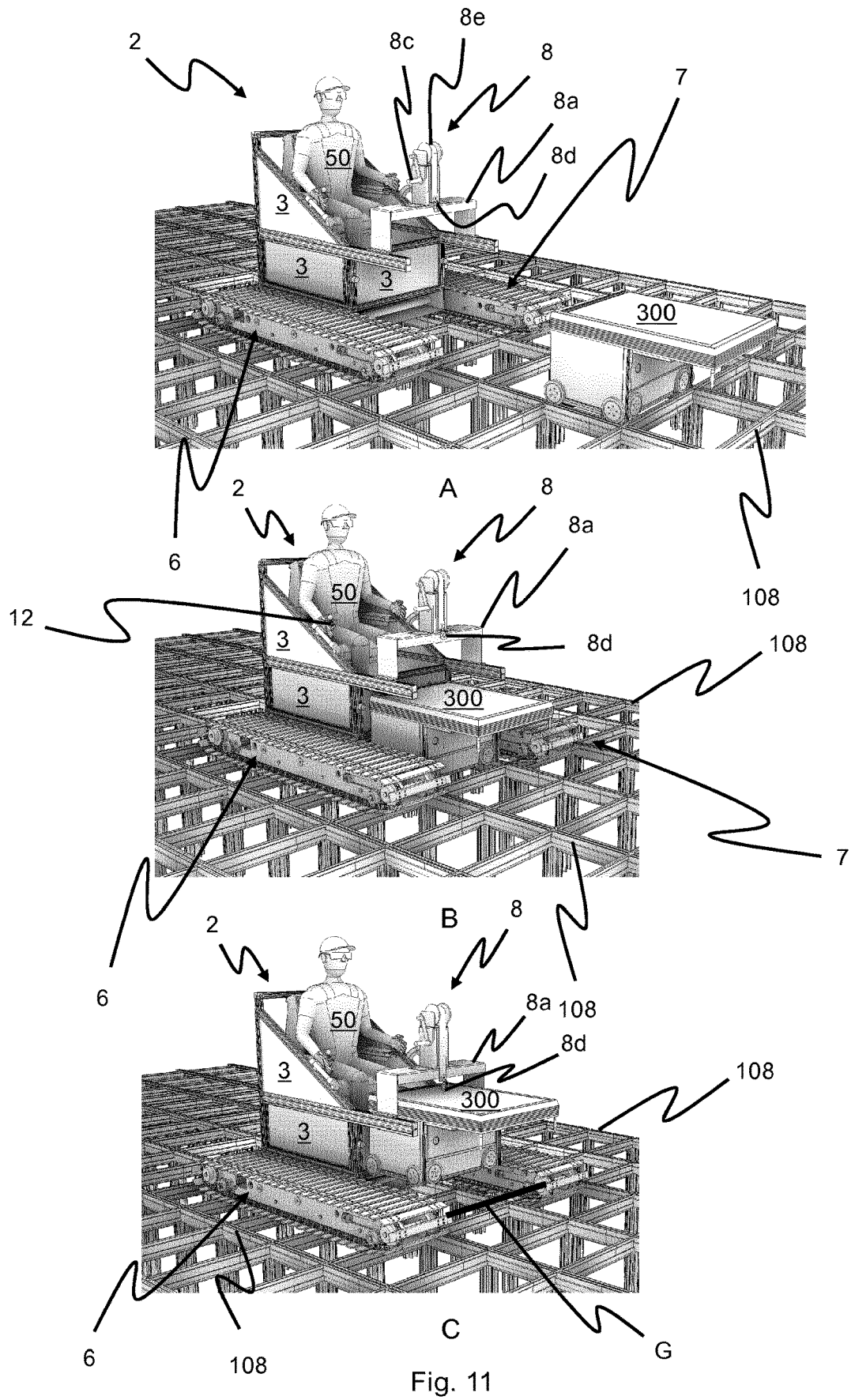
FIGS. 11A-C are perspective side views of the service vehicle of FIG. 10, where

A third embodiment of the inventive service vehicle 2 is shown in FIGS. 10 and 11.

Similar to the first embodiment described above, the transfer device 8 comprises a winch arrangement having a support 8a supporting the container handling vehicle 200, 300 from above, a lifting mechanism 8c in form of a rotatable handle and a transfer drum 8e connected to the lifting mechanism 8c. As for the first and second embodiments the caterpillar tracks/rollers 6,7 have a length L extending across about four grid cells 122 and spaced apart with a width G (see FIG. 11C). The minimum width of G should be equal to, or larger than, the overall width of the container handling vehicle(s) 200,300 to be serviced. Further, the looped chains 6d of the rollers 6,7 are driven by belt wheels 6a,6b arranged at both longitudinal lengths of the rollers 6,7.

The procedure for picking up a container handling device 200,300 by the service vehicle 2 according to the third embodiment may proceed in the following way:

(FIG. 11A) An operator 50 situated into the service vehicle 2 guides the service vehicle 2 to a position adjacent to the one or more container handling vehicles 200,300 to be transported.

(FIG. 11B) The position of the service vehicle 2 is fine adjusted so that the transfer device 8 is in an interacting position, i.e. directly above, or nearly directly above, the corresponding attachment mechanism of the one or more container handling vehicles 200,300 (not shown). This interacting position may for example be obtained by moving the service vehicle 2 such that the one or more container handling vehicles 200,300 are located between the rollers 6,7.

(FIG. 11C) When the transfer device 8 is in the interacting position, the operator 50 operates, either manually or by the control system 12 or a combination thereof, the lifting mechanism 8c. In FIG. 11C the lifting mechanism 8c is a crack handle coupled to a winch/drum 8e. By rotating the crank handle 8c, the attachment device 8d in form of a hook connected to a transfer line is lowered and attached to a corresponding receiving device (not shown) on the one or more container handling vehicles 200,300.

(FIG. 11C) When the one or more container handling vehicles 200,300 are safely attached to the attachment device 8c, the operator operates the lifting mechanism 8c such that the one or more container handling vehicles 200,300 are lifted from the interacting position to the transport position clear from the rail system 108.

(FIG. 10) The service vehicle 2 is moved to its predetermined position on the rail system 108, or out of the rail system 108, with the one or more container handling vehicles 200,300.

The unloading process, i.e. the transport of the one or more container handling vehicles 200,300 by the service vehicle 2 to a predetermined position onto the rail system 108 for regular operation, proceeds equal or similar to the above described loading process, but in reverse sequence.

With particular reference to FIG. 10, the length of the rollers 6,7 are also in this example seen to extend across four grid cells 122.

Figure 12:
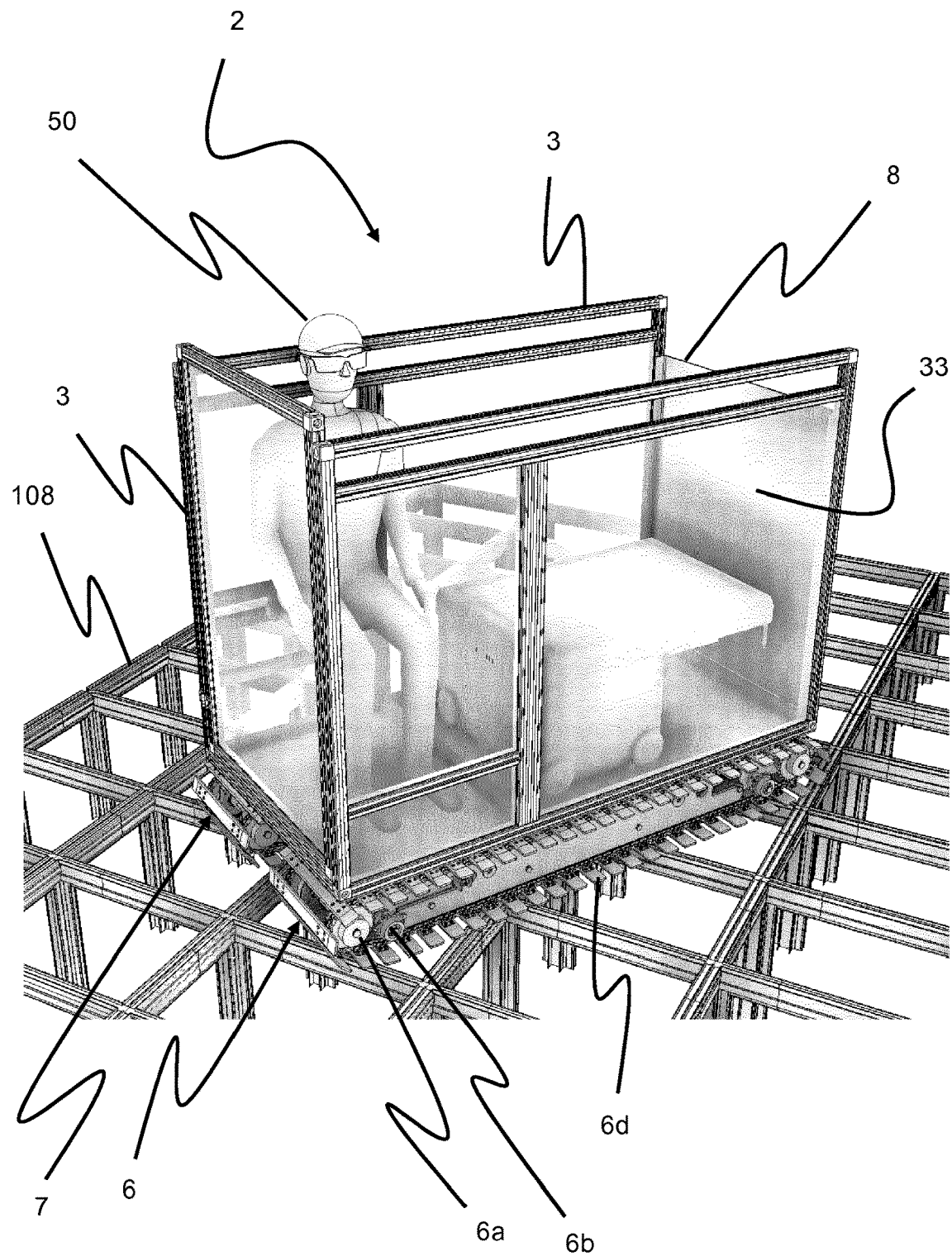
FIG. 12 is a perspective side view of a service vehicle according to a fourth embodiment of the invention operating on a rail system of an automated storage and retrieval system.
Figure 13:
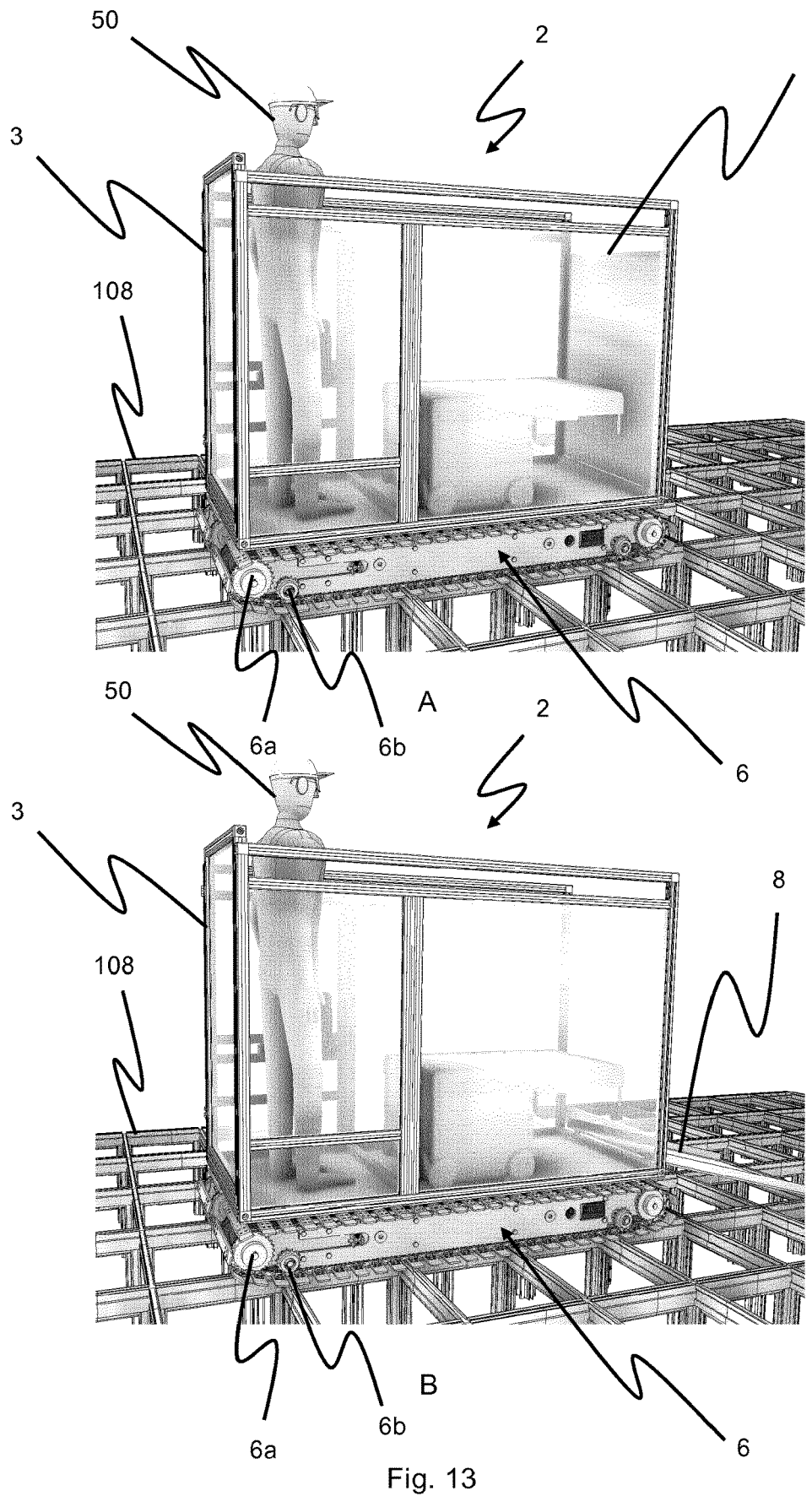
FIGS. 13A-D are perspective side views of the service vehicle of FIG. 12, where
Figure 13:
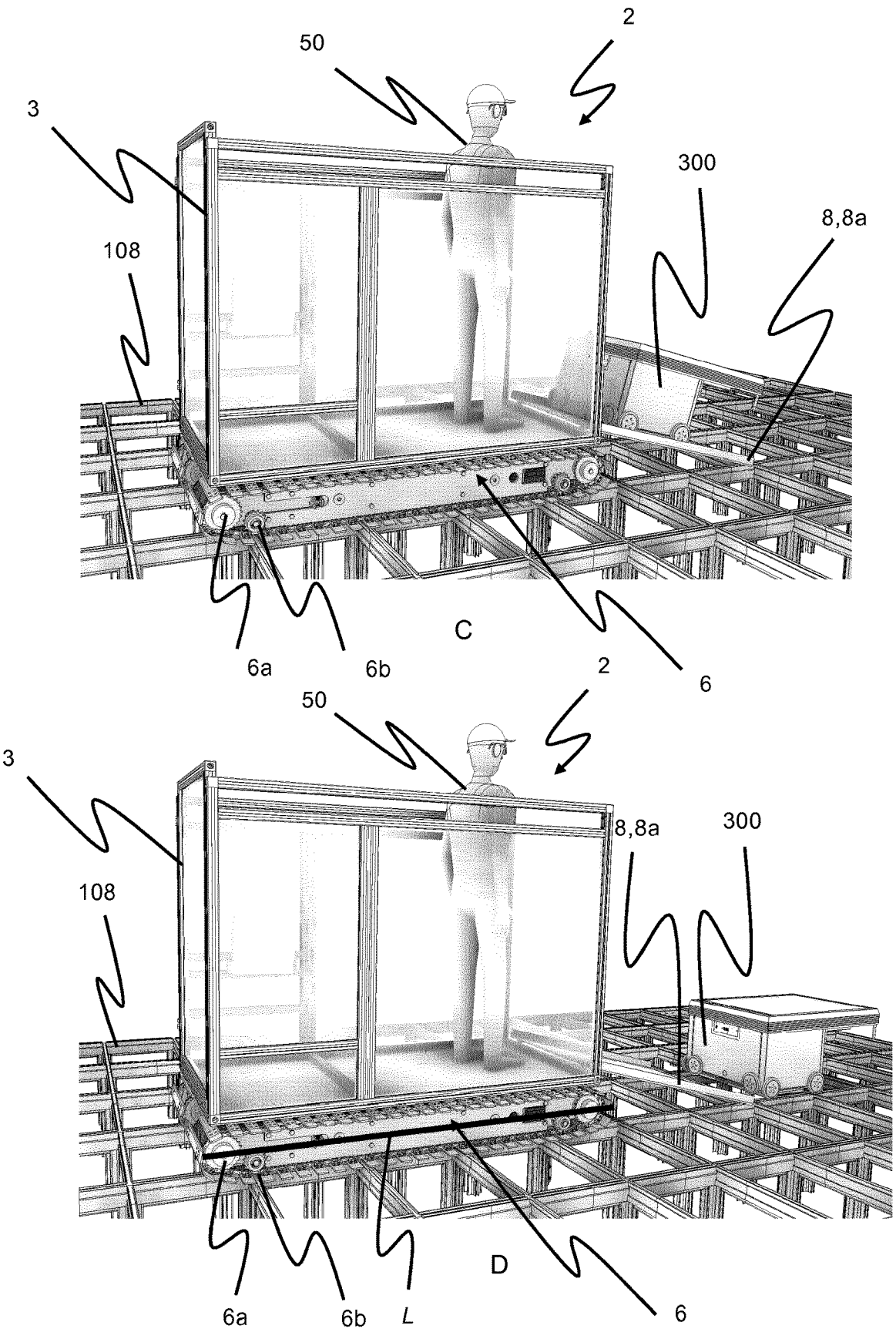
Figure 14:
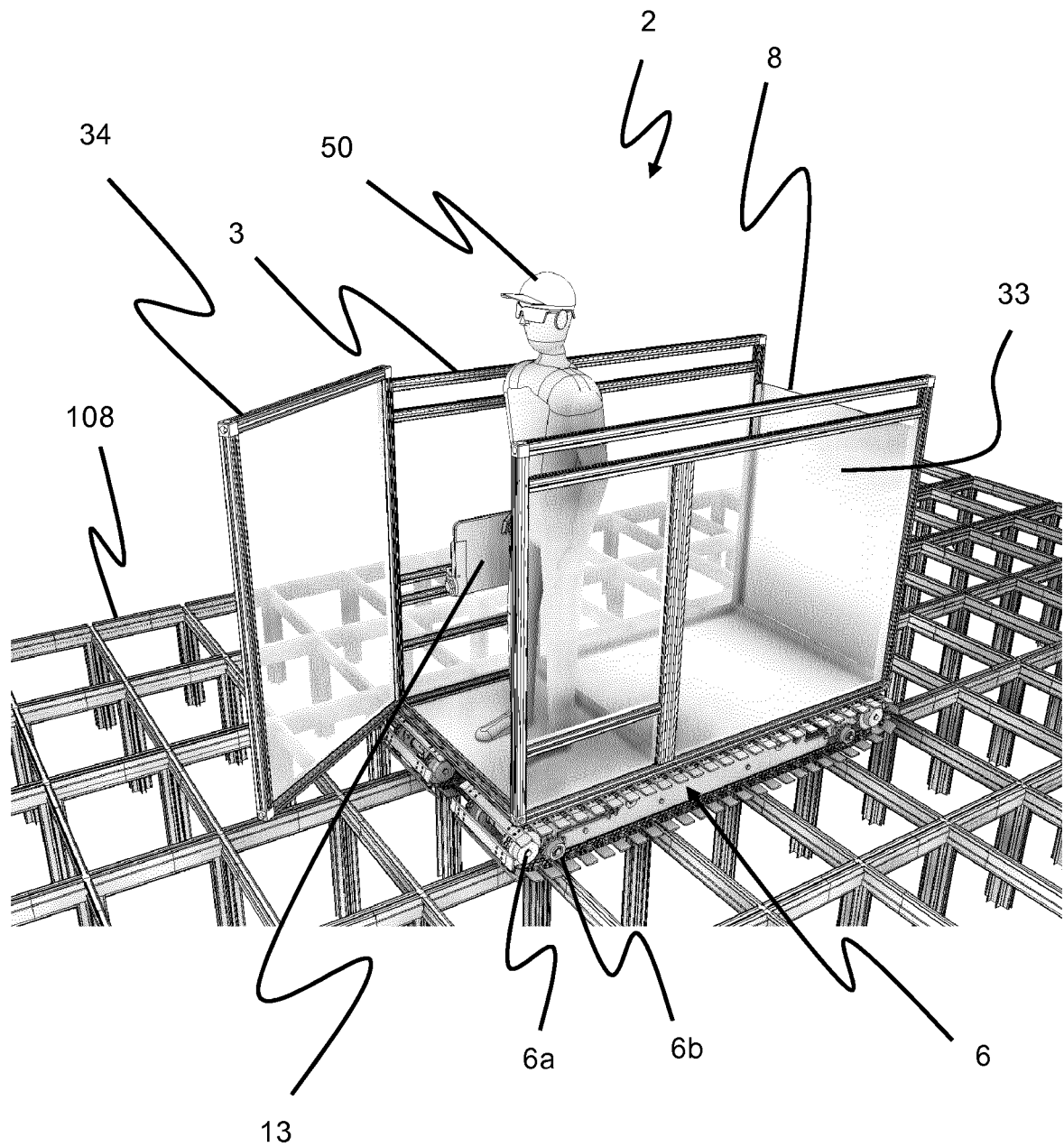
FIG. 14 is a perspective side view of the service vehicle of FIGS. 12 and 13, showing the operator in a position within the surface vehicle where he can access objects situated on or below the rail system.

FIGS. 12-14 show a fourth embodiment of a service vehicle 2 arranged on the rail system 108. The vehicle body 3 comprises a security fence 33 which defines an enclosed area, for example a protective chamber for accommodating an operator/personnel 50. The protective chamber is in the example shown in FIGS. 12-14 arranged with seating 13 for the operator 50.

The security fence 33 may be made of wall panels arranged on top of a horizontal base of the vehicle body 3. Further, at least one of the wall panels may be made of transparent panels.

The transfer device 8 may in this embodiment be a hatch or any other pivotable device onto which one or more container handling vehicles 200,300 may be driven.

The procedure for transferring one or more container handling devices 200,300 from the service vehicle 2 to a location on the rail system 108 according to the fourth embodiment may proceed in the following way:

(FIGS. 12 and 13A) The service vehicle 2 with the operator 50 moves to a position adjacent to one or more storage grid cells 122 on which the container handling vehicle(s) 200,300 to be serviced is/are located.

(FIG. 13B) When in position, the hatch 8 is opened, either by the operator 50 (manually and/or by an onboard control system), by a remote control system or a combination thereof. In fully opened position the end of the hatch 8 distant from the service vehicle 2 contacts the underlying rail system 108 at or near one rail 110,111 framing the targeted grid cell 122.

(FIG. 13C) The one or more container handling vehicles 200,300 are guided onto the rail system 108 via the opened hatch 8 either by the operator 50 (manually and/or by an onboard control system), by a remote control system or a combination thereof.

(FIG. 13D) The one or more container handling vehicles 200,300 are fine positioned either by the operator 50 (manually and/or by an onboard control system), by a remote control system or a combination thereof.

As depicted in FIG. 14, the operator 50 may in one exemplary configuration open an inspection door 34 at the side of the service vehicle 2, for example opposite the side with the hatch 8. Such a configuration may be useful to allow further manual inspection of the storage system 1.

Figure 15:
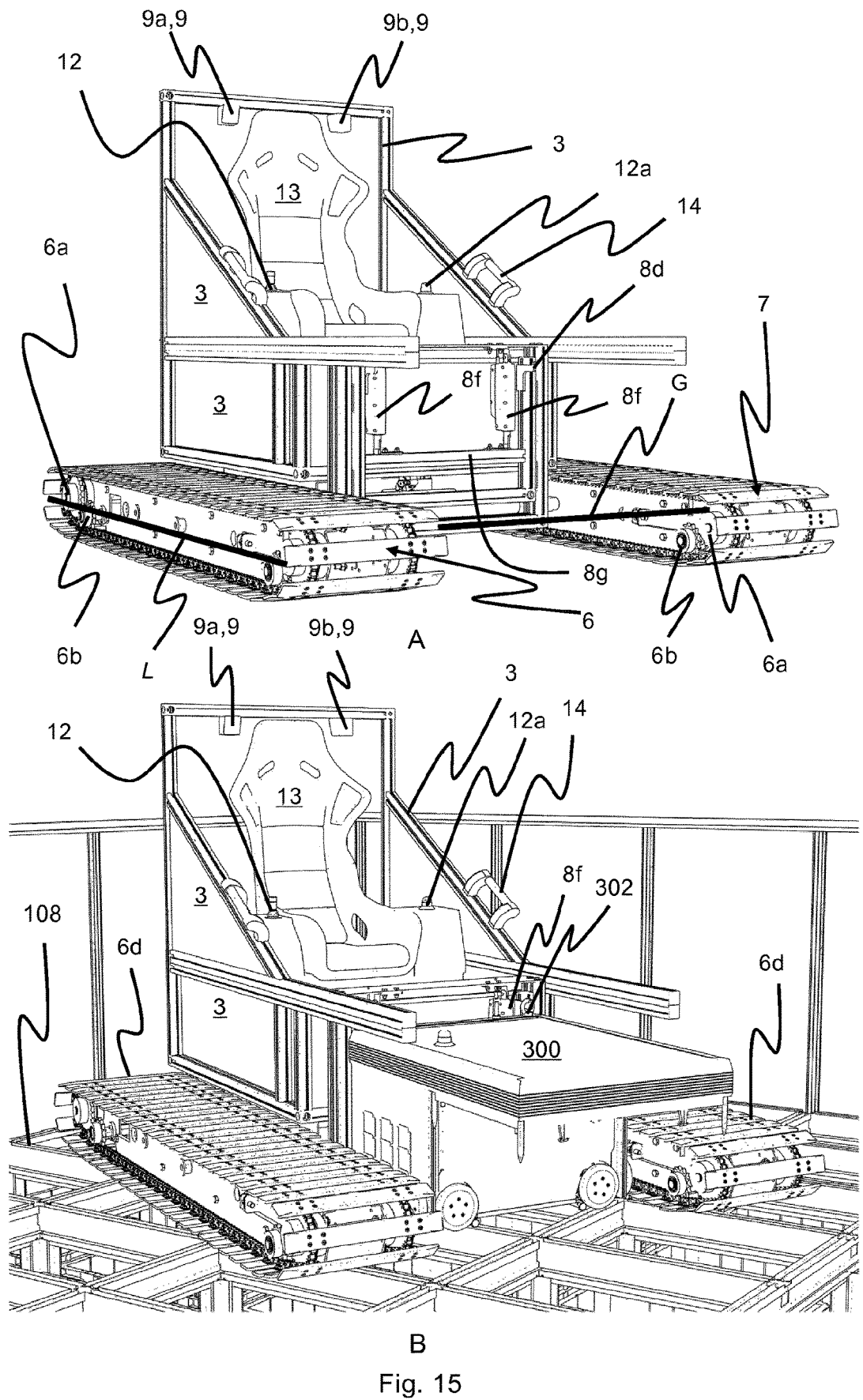

A fifth embodiment of the service vehicle 2 is illustrated in FIG. 15. The embodiment is similar to the third embodiment (FIGS. 10 and 11) with the exception of the configuration and operation of the transfer device 8.

Instead of a winched crane system 8c,8d,8e depicted in the third embodiment, the one or more container handling vehicles 200,300 are lifted by one or more lifting hooks 8d arranged onto the vehicle body 3 within the container vehicle handling part 4. As for the above disclosed embodiments, the rollers 6,7 are spaced apart by a width G.

The term lifting hook 8d should be interpreted to include any gripping mechanism able to grip a container handling vehicle 200,300.

In this fifth embodiment the lifting hook 8d is coupled to a lifting arrangement 8f,8g enabling vertical movement of the lifting hook 8d. The lifting arrangement may for example comprise one or more vertical linear actuators 8f driving a frame 8g onto which the lifting hook 8d is mounted. The term 'vertical linear actuator' is herein defined as any linear actuator able to move in a direction having a significant non-zero vertical component. In a preferred example however, the vertical linear actuator is configured to perform a vertical movement with zero, or essentially zero, horizontal displacement.

The design of the lifting hook 8d (or alternative gripping mechanism) should be such that interaction with any exterior design of the vehicle body of the relevant container handling vehicle(s) 200,300 is allowed. For example, the vehicle body of each container handling vehicle 200,300 may comprise one or more receptacles 302 such as recesses/openings/rings into which the lifting hook(s) 8d may be inserted.

The operation of the lifting hook(s) 8d may be controlled by the operator 50 (manually and/or by an onboard control system 12), by a remote control system or a combination thereof.

Further, the service vehicle 2 may be equipped by a registration unit 9 configured to aid an operator 50 to maneuver the service vehicle 2 safely to the final positions on the rail system 108. The registration unit 9 may for example be an image capturing unit 9 comprising a forward camera 9a and a rearward camera 9b as illustrated in FIG. 15 and/or one or more rotatable cameras. The image capturing unit 9 may be any optical instrument for recording or capturing images. The images or films may be stored locally, transmitted to remote location, or a combination thereof.

The image capturing unit 9 may be controlled and visualized by an operator 50 onboard the service vehicle 2, remotely or a combination thereof.

Further, the first to fifth embodiments of the service vehicle 2 have preferably an emergency stop button 12a as depicted in FIG. 15, constituting part of the onboard control system 12.

FIGS. 16-18 show a sixth embodiment of the service vehicle 2 in accordance with the invention, in which all operations of the vehicle 2 are performed fully remote, that is, without any need for a human operator to directly interact with a control system onboard the vehicle 2 during the service procedure.

In the sixth embodiment, the service vehicle 2 comprises two caterpillar tracks/rollers 6,7 coupled to two opposite vertical sides of a vehicle body 3. At least one of the two other vertical sides of the vertical body 3 is configured to receive at least one container handling vehicle 200,300 to be serviced.

FIGS. 16-18 shows a particular configuration where service vehicle 2 comprises two guiding pins 35 attached to each of the opposite vertical sides of the vehicle body 3 onto which the caterpillar tracks 6,7 are connected. The ends of each guiding pins 35 nearest the container handling vehicle receiving side of the vehicle body 3 displays a wedge shape allowing the contain handling vehicle 200,300 to be guided correctly into the vehicle body 3. A remotely operated registration unit 9 in form of a forward camera 9a and a rearward camera 9b is mounted on the top horizontal side of the vehicle body 3.

The transfer device 8 comprises a lifting mechanism 8c which includes one or more vertical linear actuators 8f. Each of the actuators 8f has one end connected to a pivot support 8h pivotally couples to the vehicle body 3 with a rotational axis parallel to the underlying rail system 108 and the other end to a lifting claw 8d. The lifting claws 8d may be displaceable in a horizontal direction relative to the vehicle body 3 by use of horizontal linear actuators 8i, i.e. with a horizontal non-zero component.

The service vehicle 2 is remotely operated by a remote control system via one or more onboard transmitters 36. Exemplary locations of such transmitters 36 may be on one, some or all of the vertical linear actuations as depicted in FIGS. 16-18. Alternatively, or in addition, similar transmitters 36 may be arranged on the vehicle body 3, within the registration unit 9, on one or both of the rollers 6,7, etc.

As for the above disclosed embodiments the caterpillar tracks/rollers 6,7 have a length L extending across a plurality of grid cells 122, preferably four or more.

In the sixth embodiment the opening of the vertical containing handling vehicle receiving side of the vehicle body 3, including any guiding pins 35, has a minimum width G being equal to, or larger than, the overall width of the container handling vehicle(s) 200,300 to be serviced.

The procedure for picking up a container handling device 200,300 by the service vehicle 2 according to the third embodiment may proceed in the following way:

(FIG. 17A) The service vehicle 2 approaches a position adjacent to the one or more container handling vehicles 200,300 to be transported using signal communication between a remote control system and the one or more of the onboard transmitters/receivers. If needed, the orientation of the service vehicle 2 is changed so that the vehicle receiving opening of the service vehicle 2 are facing towards the container handling vehicle(s) 200,300.

(FIGS. 17B and C) The service vehicle 2 is remotely guided so that the container handling vehicle(s) 200, 300 enters through the receiving opening of the vehicle body 3, between the two caterpillar tracks/rollers 6 so that the transfer device 8 is in an interacting position, i.e. with the plurality of lifting claws 8d arranged on two opposite vertical sides of the or each container handling vehicle 200,300. Alternatively, the service vehicle 2 may be kept still, and the container handling vehicle(s) 200,300 may be remotely guided into the vehicle receiving opening. The correct horizontal position of the container handling vehicle 200,300 inside the vehicle body 3 can be further controlled by a stopper 37 arranged on the vertical side opposite of the receiving opening. Such a stopper 37 will also contribute to increase the stability of the container handling vehicle 200,300 within the vehicle body 3. In the example shown in FIGS. 16-18 this stopper is illustrated as a horizontal extending bar arranged to abut the container handling vehicle 200,300 when the latter is fully inside the vehicle body 3 of the service vehicle 2.

(FIG. 18A) When the transfer device 8 is in the interacting position relative to the container handling vehicle(s) 200,300, the lifting claws 8d are displaced horizontally using the horizontal linear actuators 8i until the lifting claws 8d make physical contact with the container handling vehicle(s) 200,300.

(FIG. 18B) The vertical linear actuator(s) 8f is/are remotely operated, causing the vehicle body 3 to be lifted from the rail system 108 due to the pivoting movement of the pivot support(s) 8h. Due to the established physical contact between the lifting claws 8d and the container handling vehicle(s) 200,300, the latter is lifted from the rail system 108, thereby setting the service vehicle 2 in a transport position.

The service vehicle 2 is moved to its predetermined position on the rail system 108, or out of the rail system 108, with the one or more container handling vehicles 200,300.

The unloading process, i.e. the transport of the one or more container handling vehicles 200,300 by the service vehicle 2 to a predetermined position onto the rail system 108 for regular operation, proceeds equal or similar to the above described loading process, but in reverse sequence.

In all embodiments, the rollers 6,7 comprise looped chains 6d driven by toothed belt wheels 6a,6b arranged within the chains 6d. However, it may be envisaged configuration where one or more of the toothed wheels 6a,6b are arranged outside the looped chain 6d. Instead of toothed wheels 6,7, the rollers 6,7 may comprise alternative drive mechanism such as wheels having other types of means for meshing or coupling to their respective chains 6d. Further, the rollers 6,7 may be composed of components other than endless belts, for example a set of wheels wide enough to cover at least one grid cell 122.

Even if only the sixth embodiment is disclosed without a dedicated space for a human operator, all the embodiments of the service vehicle 2 may be easily configured to be maneuvered on the rail system 2 without the need for an onboard operator 50, for example by operations performed entirely by a remotely located human operator 50 or by a fully or partly automated control system or a combination thereof.

It may also be envisaged embodiments where the full operation of the service vehicle 2 is partly due to the operation of an onboard operator and partly due to a remotely located human operator or alternatively a combination between the operation of an onboard operator and a fully or partly automated control system.

In the preceding description, various aspects of the vehicle and the storage system according to the invention have been described with reference to the illustrative embodiment. For purposes of explanation, specific numbers, systems and configurations were set forth in order to provide a thorough understanding of the vehicle and its workings. However, this description is not intended to be construed in a limiting sense. Various modifications and variations of the illustrative embodiments, as well as other embodiments of the vehicle, which are apparent to persons skilled in the art to which the disclosed subject matter pertains, are deemed to lie within the scope of the present invention.

REFERENCE NUMERALS

1 Storage and retrieval system/storage structure
2 Service vehicle
3 Vehicle body
4 Container vehicle handling part
5 Operational part
6 First propulsion means/propulsion mechanism/rolling means/roller/caterpillar track
6a First toothed belt wheel for each endless belt 6,7
6b Second toothed belt wheel for each endless belt 6,7
6c Inner surface of the endless belt 6,7
6d Looped chain/endless belt
7 Second propulsion means/propulsion mechanism/rolling means/roller/caterpillar track
8 Transfer device
8a Base plate/Transfer device support
8b Transfer beams
8c Transfer motor/lifting mechanism
8d Attachment device/lifting hook/lifting claw
8e Transfer drum
8f Vertical linear actuator
8g Frame connected to vertical linear actuator and lifting hook
8h Pivot support for vertical linear actuator
8i Horizontal linear actuator
9 Registration unit/image capturing unit
9a Forward camera
9b Rearward camera
12 Operating system/control system
12a Emergency stop
14 Handle
13 Operator chair
33 Security fence
34 Inspection door
35 Guiding pin
35a Wedge-shape at end of guiding pin
36 Transmitter/receiver
37 Stopper
50 Operator
100 Framework structure
102 Upright members of framework structure
103 Horizontal members of framework structure
104 Storage grid/three dimensional grid
105 Storage column
106 Storage container
107 Stack
108 Rail system
110 First set of parallel rails in first direction (X)
111 Second set of parallel rails in second direction (Y)
115 Grid opening
119 Drop-off port column
120 Pick-up port column
122 Grid cell
200 First container handling vehicle
201 Wheel arrangement
300 Second container handling vehicle
301 Wheel arrangement
302 Receptacle (for lifting hook 8d)
X First direction
Y Second direction
P Horizontal plane
L Length of propulsion means 6,7
W Width of propulsion means 6,7
G Width a spacing between the first and second endless belt 6,7

The invention claimed is:

1. An automated storage and retrieval system comprising:
   a storage grid comprising storage columns arranged in rows, in which storage columns storage containers are stacked one on top of another to form stacks,
   a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells;
   at least one container handling vehicle being configured to move on the rail system, wherein the at least one container handling vehicle comprises a wheel arrangement being configured to guide the at least one storage container vehicle along the rail system in at least one of the first direction and the second direction; and a service vehicle for movement on the rail system, comprising:
- a container vehicle handling part for mechanical interacting with the at least one container handling vehicle operating on the rail system,
- an operational part for controlling operations of the service vehicle, and
- propulsion means, wherein the propulsion means allow movement of the service vehicle in any direction over the top of the rail system during operation, wherein the propulsion means comprises:
- a first caterpillar track comprising a longitudinal extending endless belt,
- a second caterpillar track comprising a longitudinally extending endless belt directed parallel to the endless belt of the first caterpillar track,
- a belt motor driving the endless belts,
- wherein the first and second caterpillar track have, when moving over the top of the rail system an overall length L exceeding the distance across two grid cells in the first direction and the second direction, wherein movement of the caterpillar tracks over the top of the rail system signify that the caterpillar tracks are supported on the rail system, but do not engage with the rails themselves.

2. The automated storage and retrieval system in accordance with claim 1, wherein the first caterpillar track further comprises
- at least one belt wheel contacting the endless belt,
- wherein the belt motor is configured to drive the endless belt via the at least one belt wheel, and the second caterpillar track further comprises
- at least one belt wheel contacting the endless belt,
- wherein the belt motor is configured to drive the endless belt via the at least one belt wheel.

3. The automated storage and retrieval system in accordance with claim 1, wherein the first caterpillar track further comprises
- at least one belt wheel contacting an inner surface of first endless belt,
    - wherein the at least one belt wheel has a rotational axis parallel to a rotational axis of the endless belt, and the second caterpillar track further comprises
- at least one belt wheel contacting an inner surface of first endless belt,
    - wherein the at least one belt wheel has a rotational axis parallel to a rotational axis of the endless belt.

4. The automated storage and retrieval system in accordance with claim 3, wherein the first caterpillar track and the second caterpillar track are spaced apart by a gap in a direction of the rotational axis of the endless belts.

5. The automated storage and retrieval system in accordance with claim 1, wherein the container vehicle handling part of the service vehicle comprises
- a transfer device configured to transfer at least one container handling vehicle between an operating position on the rail system and a transport position within a vehicle body and
- a transfer motor configured to power the transfer device to allow said transfer of the container handling vehicle.

6. The automated storage and retrieval system in accordance with claim 5, wherein at least part of the transfer device is configured to move between an upper position and a lower position relative to the horizontal plane.

7. The automated storage and retrieval system in accordance with claim 5, wherein the transfer device is arranged at least partly between the first and second caterpillar tracks.

8. The automated storage and retrieval system in accordance with claim 5, wherein the transfer device is configured to support the container handling vehicle from below.

9. The automated storage and retrieval system in accordance with claim 5, wherein the transfer device comprises a base plate onto which the container handling vehicle may be supported.

10. The automated storage and retrieval system in accordance with claim 1, wherein the operational part of the service vehicle comprises
- a propulsion means motor allowing movement of the service vehicle along the horizontal plane and
- an operating system allowing an operator to control and regulate both the direction and the speed of the service vehicle relative to the underlying rail system.

11. The automated storage and retrieval system in accordance with claim 1, wherein the service vehicle further comprises a registration unit being configured to allow visual inspection of the surroundings of the service vehicle.

12. The automated storage and retrieval system in accordance with claim 1, wherein the service vehicle is arranged for transporting at least one of the at least one container handling vehicle in the horizontal plane and for transporting one or more people.

13. The automated storage and retrieval system in accordance claim 1, wherein the service vehicle comprises a transmitter for establishing signal communication with a remote control system.

14. The automated storage and retrieval system in accordance with claim 1, wherein the container vehicle handling part of the service vehicle comprises
- a transfer device configured to transfer at least one container handling vehicle between an operating position on the rail system and a transport position within a vehicle body,
- wherein the transfer device comprises
    - an attachment device for releasable attachment to the at least one container handling vehicle,
    - a vertical linear actuator attached at one end at least indirectly to the vehicle body and the other end at least indirectly to the attachment device,
    - wherein the vertical linear actuator is configured to displace the attachment device relative to the vehicle body in a vertical direction.

15. A method for operating a service vehicle in the automated storage and retrieval system according to claim 1, wherein the method comprises the following steps:
- guiding the service vehicle to a first position on the rail system adjacent to at least one storage container vehicle by operating the operational part,
- controlling a transfer device to transfer the at least one container handling vehicle between an operating position on the rail system and a transport position above the rail system and
- guiding the service vehicle to a predetermined second position on or outside the rail system.

* * * * *